(12) United States Patent
Cha et al.

(10) Patent No.: US 12,289,704 B2
(45) Date of Patent: Apr. 29, 2025

(54) METHOD FOR TRANSMITTING/RECEIVING SIGNAL IN WIRELESS COMMUNICATION SYSTEM, AND APPARATUS FOR SUPPORTING SAME

(71) Applicant: LG ELECTRONICS INC., Seoul (KR)

(72) Inventors: Hyunsu Cha, Seoul (KR); Byounghoon Kim, Seoul (KR); Jeongsu Lee, Seoul (KR); Youngdae Lee, Seoul (KR); Kijun Kim, Seoul (KR); Sukhyon Yoon, Seoul (KR); Hyunsoo Ko, Seoul (KR); Suckchel Yang, Seoul (KR); Hyangsun You, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 354 days.

(21) Appl. No.: 17/912,748

(22) PCT Filed: Mar. 22, 2021

(86) PCT No.: PCT/KR2021/003494
§ 371 (c)(1),
(2) Date: Sep. 19, 2022

(87) PCT Pub. No.: WO2021/187962
PCT Pub. Date: Sep. 23, 2021

(65) Prior Publication Data
US 2023/0142084 A1    May 11, 2023

(30) Foreign Application Priority Data

Mar. 20, 2020 (KR) .................. 10-2020-0034544
Sep. 24, 2020 (KR) .................. 10-2020-0124037
Oct. 12, 2020 (KR) .................. 10-2020-0130790

(51) Int. Cl.
*H04W 64/00* (2009.01)
*H04L 5/00* (2006.01)

(52) U.S. Cl.
CPC .......... *H04W 64/00* (2013.01); *H04L 5/0051* (2013.01)

(58) Field of Classification Search
CPC .................................................. H04W 64/00
(Continued)

(56) References Cited

U.S. PATENT DOCUMENTS

| 2015/0188678 A1 | 7/2015 | Wu et al. |
| 2016/0077185 A1 | 3/2016 | Marshall et al. |

(Continued)

FOREIGN PATENT DOCUMENTS

| EP | 3086524 A1 | 10/2016 |
| WO | 2016032308 A1 | 3/2016 |

OTHER PUBLICATIONS

Ericsson, "UE and gNB measurements for NR positioning", 3GPP TSG RAN WG1 #99, Oct. 18-22, 2019, R1-1913137.

*Primary Examiner* — Qutbuddin Ghulamali
(74) *Attorney, Agent, or Firm* — BRYAN CAVE LEIGHTON PAISNER LLP

(57) ABSTRACT

Various embodiments relate to a next generation wireless communication system for supporting a data transmission rate higher than that of a $4^{th}$ generation (4G) wireless communication system. According to various embodiments, provided are a method for transmitting/receiving a signal in a wireless communication system, and an apparatus for supporting same, and various other embodiments can also be provided.

13 Claims, 26 Drawing Sheets

(58) Field of Classification Search
USPC .......................................................... 455/456.1
See application file for complete search history.

(56) References Cited

U.S. PATENT DOCUMENTS

| | | | |
|---|---|---|---|
| 2017/0289898 A1* | 10/2017 | Youn ...................... | H04W 76/16 |
| 2017/0289953 A1* | 10/2017 | Chae ........................ | G01S 1/20 |
| 2021/0232610 A1* | 7/2021 | Su .......................... | H04W 4/021 |

* cited by examiner (a)

(b)

(a)

(b)

METHOD FOR TRANSMITTING/RECEIVING SIGNAL IN WIRELESS COMMUNICATION SYSTEM, AND APPARATUS FOR SUPPORTING SAME

This application is the National Stage filing under 35 U.S.C. 371 of International Application No. PCT/KR2021/003494 filed on Mar. 22, 2021, which claims priority to Korean Patent Application Nos. 10-2020-0034544 filed on Mar. 20, 2020; 10-2020-0124037 filed on Sep. 24, 2020 and 10-2020-0130790 filed on Oct. 12, 2020, the contents of which are all hereby incorporated by reference herein in their entirety.

TECHNICAL FIELD

Various embodiments relate to a wireless communication system.

BACKGROUND ART

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

DISCLOSURE

Technical Problem

Various embodiments may provide a method and apparatus for transmitting and receiving a signal in a wireless communication system.

Various embodiments may provide a positioning method based on timing measurement and an apparatus supporting the same.

It will be appreciated by persons skilled in the art that the objects that could be achieved with the various embodiments are not limited to what has been particularly described hereinabove and the above and other objects that the various embodiments could achieve will be more clearly understood from the following detailed description.

Technical Solution

Various embodiments may provide a method and apparatus for transmitting and receiving a signal in a wireless communication system.

According to various embodiments, a method performed by an apparatus in a wireless communication system may be provided.

According to various embodiments, the method may include receiving a plurality of reference signals (RSs) related to positioning, obtaining a measurement value related to the positioning, and reporting information regarding the measurement value.

According to various embodiments, the obtaining of the measurement value may include acquiring a plurality of samples based on at least one RS among the plurality of RSs, and obtaining the measurement value based on applying a preconfigured filter to the plurality of samples.

According to various embodiments, (i) based on information related to a time window for the positioning being obtained, the at least one RS may be included in the time window; or (ii) based on information related to the number of measurement samples being obtained, the number of the plurality of samples may be less than or equal to the number of the measurement samples.

According to various embodiments, based on the information related to the time window being obtained, RSs other than the at least one RS among the plurality of RSs may not be included in the time window.

According to various embodiments, the method may further include, based on the information related to the time window being autonomously obtained by the apparatus, transmitting the information related to the time window.

According to various embodiments, each of the plurality of RSs may be received based on a periodically configured positioning reference signal (PRS), According to various embodiments, a size of a period of the periodically configured PRS may be less than or equal to a size of the time window.

According to various embodiments, the applying of the preconfigured filter to the plurality of samples may include applying Equation 1 below:

$$\Sigma_{n=1}^{L} R_n a_n, \qquad \text{[Equation 1]}$$

where L may be the number of the plurality of samples, $R_n$ may be an n-th sample among the plurality of samples, and $a_n$ may be a weighting factor used for the n-th sample.

According to various embodiments, information related to the weighting factor may be received.

According to various embodiments, the method may further include one or more of: transmitting information related to the plurality of samples; or transmitting information related to the preconfigured filter.

According to various embodiments, a user equipment (UE) configured to operate in a wireless communication system may be provided.

According to various embodiments, the UE may include a transceiver, and at least one processor coupled with the transceiver.

According to various embodiments, the at least one processor may be configured to receive a plurality of reference signals (RSs) related to positioning, obtain a measurement value related to the positioning, and report information regarding the measurement value.

According to various embodiments, in obtaining the measurement value, the at least one processor may be configured to acquire a plurality of samples based on at least one RS among the plurality of RSs and obtain the measurement value based on applying a preconfigured filter to the plurality of samples.

According to various embodiments, in applying the preconfigured filter to the plurality of samples, the at least one processor may be configured to apply Equation 1:

$$\Sigma_{n=1}^{L} R_n a_n, \qquad \text{[Equation 1]}$$

where L may be the number of the plurality of samples, $R_n$ may be an n-th sample among the plurality of samples, and $a_n$ may be a weighting factor used for the n-th sample.

According to various embodiments, the at least one processor may be configured to communicate with at least one of a UE, a network, and an autonomous vehicle other than a vehicle in which the UE is included.

According to various embodiments, a method performed by an apparatus in a wireless communication system may be provided.

According to various embodiments, the method may include transmitting a reference signal (RS) related to positioning, and receiving information regarding a measurement value related to the positioning.

According to various embodiments, the measurement value may be equal to a value obtained based on applying a preconfigured filter to a plurality of samples based on at least one RS among a plurality of RSs related to the positioning including the RS.

According to various embodiments, a base station operating in a wireless communication system may be provided.

According to various embodiments, the base station may include a transceiver, and at least one processor coupled with the transceiver.

According to various embodiments, the at least one processor may be configured to transmit a reference signal (RS) related to positioning, and receive information regarding a measurement value related to the positioning.

According to various embodiments, the measurement value may be equal to a value obtained based on applying a preconfigured filter to a plurality of samples based on at least one RS among a plurality of RSs related to the positioning including the RS.

According to various embodiments, an apparatus operating in a wireless communication system may be provided.

According to various embodiments, the apparatus may include at least one processor, and at least one memory storing at least one instruction to cause the at least one processor to perform a method.

According to various embodiments, the method may include receiving a plurality of reference signals (RSs) related to positioning, obtaining a measurement value related to the positioning, and reporting information regarding the measurement value.

According to various embodiments, the obtaining of the measurement value may include acquiring a plurality of samples based on at least one RS among the plurality of RSs, and obtaining the measurement value based on applying a preconfigured filter to the plurality of samples.

According to various embodiments, a processor-readable medium storing at least one instruction to cause at least one processor to perform a method may be provided.

According to various embodiments, the method may include receiving a plurality of reference signals (RSs) related to positioning, obtaining a measurement value related to the positioning, and reporting information regarding the measurement value.

According to various embodiments, the obtaining of the measurement value may include acquiring a plurality of samples based on at least one RS among the plurality of RSs, and obtaining the measurement value based on applying a preconfigured filter to the plurality of samples.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

Advantageous Effects

According to various embodiments, a signal may be effectively transmitted and received in a wireless communication system.

According to various embodiments, positioning may be effectively performed in a wireless communication system.

According to various embodiments, RTT accuracy may be improved.

According to various embodiments, UE positioning accuracy may be improved.

According to various embodiments, TA accuracy may be improved.

It will be appreciated by persons skilled in the art that the effects that can be achieved with the various embodiments are not limited to what has been particularly described hereinabove and other advantages of the various embodiments will be more clearly understood from the following detailed description taken in conjunction with the accompanying drawings.

DESCRIPTION OF DRAWINGS

The accompanying drawings are provided to help understanding of various embodiments, along with a detailed description. However, the technical features of various embodiments are not limited to a specific drawing, and features disclosed in each drawing may be combined with each other to constitute a new embodiment. Reference numerals in each drawing denote structural elements.

MODE FOR DISCLOSURE

Various embodiments are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

Various embodiments are described in the context of a 3GPP communication system (e.g., including LTE, NR, 6G, and next-generation wireless communication systems) for clarity of description, to which the technical spirit of the various embodiments is not limited. For the background art, terms, and abbreviations used in the description of the various embodiments, refer to the technical specifications published before the present disclosure. For example, the documents of 3GPP TS 36.211, 3GPP TS 36.212, 3GPP TS 36.213, 3GPP TS 36.300, 3GPP TS 36.321, 3GPP TS 36.331, 3GPP TS 36.355, 3GPP TS 36.455, 3GPP TS 37.355, 3GPP TS 37.455, 3GPP TS 38.211, 3GPP TS 38.212, 3GPP TS 38.213, 3GPP TS 38.214, 3GPP TS 38.215, 3GPP TS 38.300, 3GPP TS 38.321, 3GPP TS 38.331, 3GPP TS 38.355, 3GPP TS 38.455, and so on may be referred to.

1. 3GPP System 1.1. Physical Channels and Signal Transmission and Reception

In a wireless access system, a UE receives information from a base station on a downlink (DL) and transmits information to the base station on an uplink (UL). The information transmitted and received between the UE and the base station includes general data information and various types of control information. There are many physical channels according to the types/usages of information transmitted and received between the base station and the UE.

Figure 1:
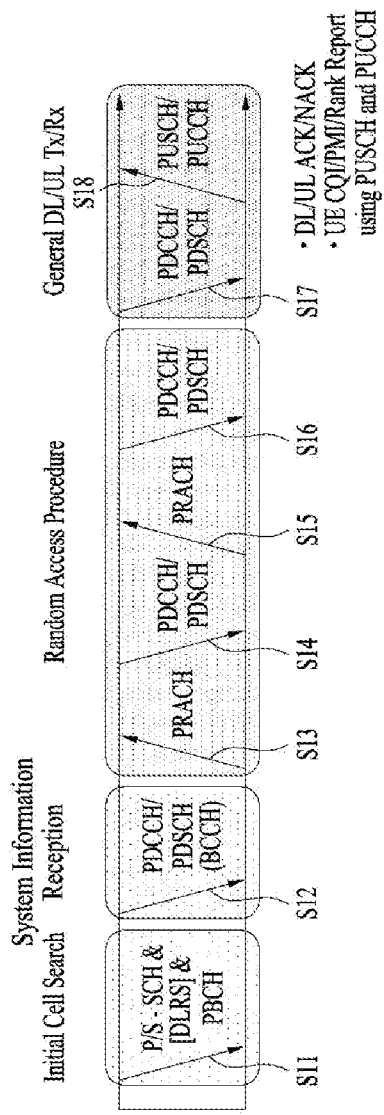
FIG. 1 is a diagram illustrating physical channels and a signal transmission method using the physical channels, which may be used in various embodiments.

FIG. 1 is a diagram illustrating physical channels and a signal transmission method using the physical channels, which may be used in various embodiments.

When powered on or when a UE initially enters a cell, the UE performs initial cell search involving synchronization with a BS in step S11. For initial cell search, the UE receives a synchronization signal block (SSB). The SSB includes a primary synchronization signal (PSS), a secondary synchronization signal (SSS), and a physical broadcast channel (PBCH). The UE synchronizes with the BS and acquires information such as a cell Identifier (ID) based on the PSS/SSS. Then the UE may receive broadcast information from the cell on the PBCH. In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S12.

Subsequently, to complete connection to the eNB, the UE may perform a random access procedure with the eNB (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a physical uplink shared channel (PUSCH) by using scheduling information in the RAR (S15), and perform a contention resolution procedure including reception of a PDCCH signal and a PDSCH signal corresponding to the PDCCH signal (S16).

Aside from the above 4-step random access procedure (4-step RACH procedure or type-1 random access procedure), when the random access procedure is performed in two steps (2-step RACH procedure or type-2 random access procedure), steps S13 and S15 may be performed as one UE transmission operation (e.g., an operation of transmitting message A (MsgA) including a PRACH preamble and/or a PUSCH), and steps S14 and S16 may be performed as one BS transmission operation (e.g., an operation of transmitting message B (MsgB) including an RAR and/or contention resolution information)

After the above procedure, the UE may receive a PDCCH and/or a PDSCH from the BS (S17) and transmit a PUSCH and/or a physical uplink control channel (PUCCH) to the BS (S18), in a general UL/DL signal transmission procedure.

Control information that the UE transmits to the BS is generically called uplink control information (UCI). The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Physical Resource

Regarding physical resources in the NR system, antenna ports, a resource grid, resource elements (REs), resource blocks (RBs), carrier parts, and so one may be considered. The physical resources in the NR system will be described below in detail.

An antenna port is defined such that a channel conveying a symbol on an antenna port may be inferred from a channel conveying another symbol on the same antenna port. When the large-scale properties of a channel carrying a symbol on one antenna port may be inferred from a channel carrying a symbol on another antenna port, the two antenna ports may be said to be in a quasi-co-located or quasi co-location (QCL) relationship. The large-scale properties include one or more of delay spread, Doppler spread, frequency shift, average received power, received timing, average delay, and a spatial reception (Rx) parameter. The spatial Rx parameter refers to a spatial (Rx) channel property parameter such as an angle of arrival.

Figure 2:
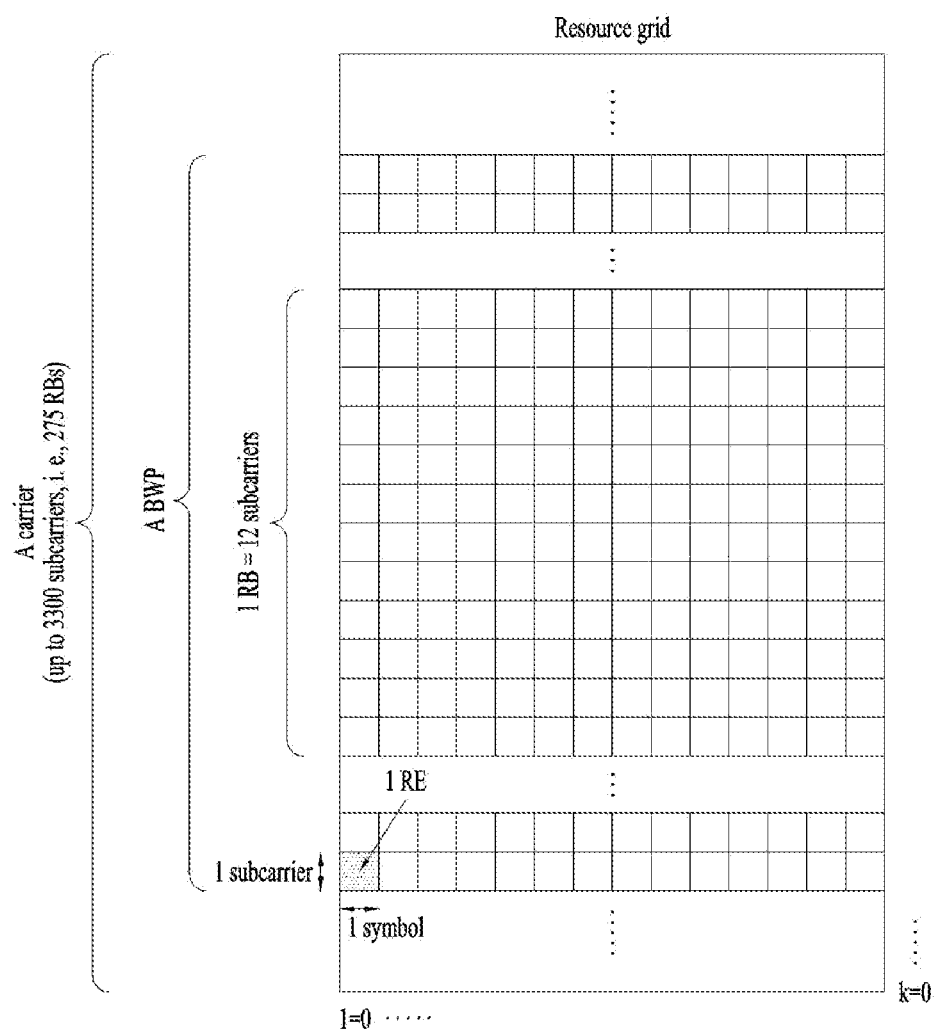
FIG. 2 illustrates an exemplary resource grid to which various embodiments are applicable.

FIG. 2 illustrates an exemplary resource grid to which various embodiments are applicable.

Referring to FIG. 2, for each subcarrier spacing (SCS) and carrier, a resource grid is defined as $14 \times 2^\mu$ OFDM symbols by $N_{grid}^{size,\mu} \times N_{SC}^{RB}$ subcarriers, where $N_{grid}^{size,\mu}$ is indicated by RRC signaling from the BS. $N_{grid}^{size,\mu}$ may vary according to an SCS configuration $\mu$ and a transmission direction, UL or DL. There is one resource grid for an SCS configuration $\mu$, an antenna port p, and a transmission direction (UL or DL). Each element of the resource grid for the SCS configuration $\mu$ and the antenna port p is referred to as an RE and uniquely identified by an index pair (k, l) where k represents an index in the frequency domain, and l represents a symbol position in the frequency domain relative to a reference point. The RE (k, l) for the SCS configuration $\mu$ and the antenna port p corresponds to a physical resource and a complex value $a_{k,l}^{(p,\mu)}$. An RB is defined as $N_{SC}^{RB}=12$ consecutive subcarriers in the frequency domain.

Considering that the UE may not be capable of supporting a wide bandwidth supported in the NR system, the UE may be configured to operate in a part (bandwidth part (BWP)) of the frequency bandwidth of a cell.

Figure 3:
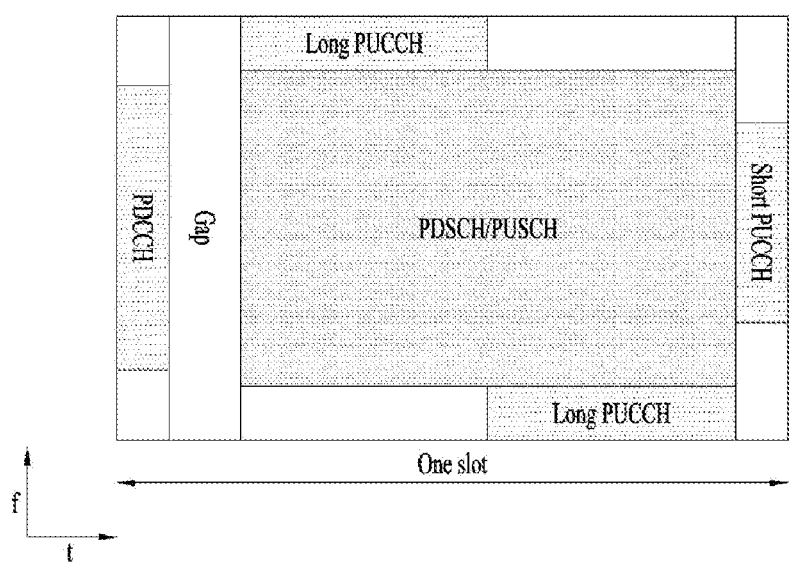
FIG. 3 is a diagram illustrating mapping of physical channels in a slot, to which various embodiments are applicable.

FIG. 3 is a diagram illustrating exemplary mapping of physical channels in a slot, to which various embodiments are applicable.

One slot may include all of a DL control channel, DL or UL data, and a UL control channel. For example, the first N symbols of a slot may be used to transmit a DL control channel (hereinafter, referred to as a DL control region), and the last M symbols of the slot may be used to transmit a UL control channel (hereinafter, referred to as a UL control region). Each of N and M is an integer equal to or larger than 0. A resource area (hereinafter, referred to as a data region) between the DL control region and the UL control region may be used to transmit DL data or UL data. There may be a time gap for DL-to-UL or UL-to-DL switching between a control region and a data region. A PDCCH may be transmitted in the DL control region, and a PDSCH may be transmitted in the DL data region. Some symbols at a DL-to-UL switching time in the slot may be used as the time gap.

The BS transmits related signals to the UE on DL channels as described below, and the UE receives the related signals from the BS on the DL channels.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH may deliver downlink control information (DCI), for example, DL data scheduling information, UL data scheduling information, and so on. The PUCCH may deliver uplink control information (UCI), for example, an acknowledgement/negative acknowledgement (ACK/NACK) information for DL data, channel state information (CSI), a scheduling request (SR), and so on.

The PDCCH carries downlink control information (DCI) and is modulated in quadrature phase shift keying (QPSK). One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling.

The UE transmits related signals on later-described UL channels to the BS, and the BS receives the related signals on the UL channels from the UE.

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH.

1.4. UL-DL Timing Relationship

Timing advance maintenance on UL will now be described.

In a system based on OFDM technology, a time required for a signal transmitted by a UE to reach a BS may vary depending on the radius of a cell, the location of the UE within the cell, and/or the moving speed of the UE. That is, if the BS does not separately manage transmission signal timings of respective UEs, there is a possibility that a transmission signal of a UE may interfere with signals transmitted by other UEs, and thus an error rate of signals received by the BS increases.

More specifically, a time consumed for a signal transmitted by a UE attempting to perform transmission at a cell edge to arrive at the BS will be longer than a time required for a signal transmitted by a UE at the center of the cell to arrive at the BS. Conversely, a time required for a signal transmitted by the UE located at the center of the cell to arrive at the BS will be relatively shorter than that of the UE located at the edge of the cell.

Since data or signals that all UEs in the cell transmit should be received within every valid time boundary in order to prevent interference in terms of the BS, the BS needs to appropriately adjust transmission timings of the signals transmitted by the UEs according to situations of the UEs and this adjustment is referred to as timing advance management.

One method of managing a timing advance may be a random access operation. That is, the random access operation causes the BS to receive a random access preamble transmitted by the UE. The BS calculates a timing advance value to make a transmission timing of the UE faster or slower using information regarding the received random access preamble. Then, the BS informs the UE of the calculated timing advance value through a random access response. The UE updates a UL transmission timing using the timing advance value.

As another method, the BS receives a sounding reference signal (SRS) periodically or randomly transmitted by the UE and calculates the timing advance value for the UE through the received signal. The BS informs the UE of the timing advance value and then the UE updates a transmission timing thereof.

As described above, the BS measures the transmission timing of the UE through the random access preamble or the SRS, calculates a timing value to be corrected, and informs the UE of the timing value to be corrected. The timing advance value (i.e., timing value to be corrected) transmitted by the BS to the UE is referred to as a timing advance command (TAC). The TAC is processed in a MAC layer. Since the UE is not always located at a fixed position, the transmission timing of the UE is changed at every time according to the moving speed of the UE and the location of the UE.

In this regard, upon receiving the TAC once from the BS, the UE needs to assume that the TAC is not always valid for an infinite time but the TAC is valid only for a specific time. A timing advance timer (TAT) is used for this purpose. That is, upon receiving the TAC from the BS, the UE starts the TAT. The UE assumes that a UL timing thereof is synchronized with the BS when the TAT is in operation. The value of the TAT may be transmitted through an RRC signal such as system information or radio bearer reconfiguration. Upon receiving a new TAC from the BS while the TAT is in operation, the UE restarts the TAT. When the TAT expires or the TAT does not operate, the UE does not transmit any UL signals, such as PUSCH and PUCCH signals, except for the random access preamble, under the assumption that the UL timing of the UE is not synchronized with the BS.

Figure 4:
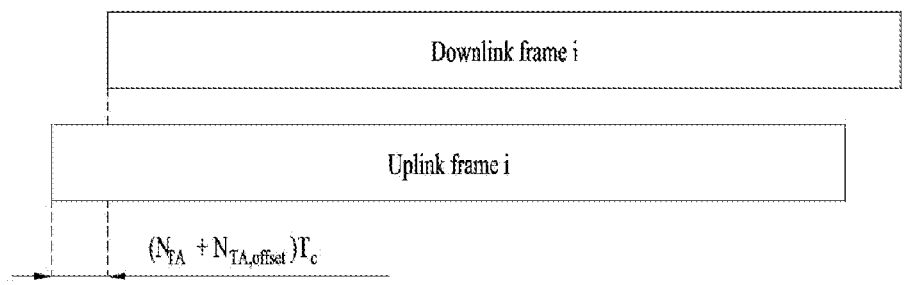
FIG. 4 is a diagram illustrating an exemplary UL-DL timing relationship to which various embodiments are applicable.

FIG. 4 is a diagram illustrating an exemplary UL-DL timing relationship applicable to various embodiments.

Referring to FIG. 4, a UE starts to transmit UL frame i $T_{TA}(=(N_{TA}+N_{TA,offset})T_c)$ seconds before a DL radio frame corresponding to UL frame i. However, $T_{TA}=0$ exceptionally for a msgA transmission on a PUSCH. $T_c=0.509$ ns.

The UE may be provided with a value $N_{TA,offset}$ of a timing advance (TA) offset for a serving cell by n-TimingAdvanceOffset for the serving cell. When the UE is not provided with n-TimingAdvanceOffset for the serving cell, the UE may determine a default value $N_{TA,offset}$ of the TA offset for the serving cell.

In the case of a random access response, a TA command, $T_A$ for a timing advance group (TAG) indicates $N_{TA}$ values by index values of $T_A=0, 1, 2, \ldots, 3846$, where an amount of the time alignment for a TAG with an SCS of $2^\mu*15$ kHz is $N_{TA}(=T_A*16*64/2^\mu)$. $N_{TA}$ is relative to the SCS of a first UL transmission from the UE after reception of a random access response.

In other cases, a TA command, $T_A$ for a TAG indicates adjustment of a current $N_{TA}$ value, $N_{TA\_old}$ to a new $N_{TA}$ value, $N_{TA\_new}$ by index values of $T_A$ (=0, 1, 2, ..., 63), where for a SCS of $2^\mu*15$ kHz, $N_{TA\_new}=N_{TA\_old}+(T_A-31)*16*64/2^\mu$.

2. Positioning

Positioning may refer to determining the geographical position and/or velocity of the UE based on measurement of radio signals. Location information may be requested by and reported to a client (e.g., an application) associated with to the UE. The location information may also be requested by a client within or connected to a core network. The location information may be reported in standard formats such as formats for cell-based or geographical coordinates, together with estimated errors of the position and velocity of the UE and/or a positioning method used for positioning.

2.1. Positioning Protocol Configuration

Figure 5:
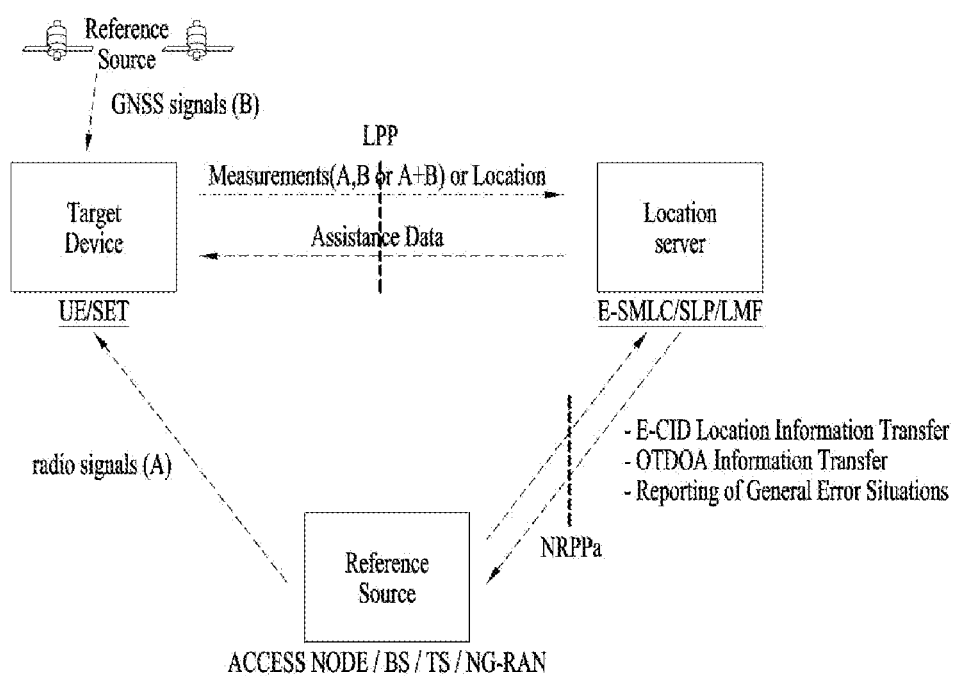
FIG. 5 is a diagram illustrating a positioning protocol configuration for positioning a user equipment (UE), to which various embodiments are applicable.

FIG. 5 is a diagram illustrating an exemplary positioning protocol configuration for positioning a UE, to which various embodiments are applicable.

Referring to FIG. 5, an LTE positioning protocol (LPP) may be used as a point-to-point protocol between a location server (E-SMLC and/or SLP and/or LMF) and a target device (UE and/or SET), for positioning the target device using position-related measurements obtained from one or more reference resources. The target device and the location server may exchange measurements and/or location information based on signal A and/or signal B over the LPP.

NRPPa may be used for information exchange between a reference source (access node and/or BS and/or TP and/or NG-RAN node) and the location server.

The NRPPa protocol may provide the following functions.

E-CID Location Information Transfer. This function allows the reference source to exchange location information with the LMF for the purpose of E-CID positioning.

OTDOA Information Transfer. This function allows the reference source to exchange information with the LMF for the purpose of OTDOA positioning.

Reporting of General Error Situations. This function allows reporting of general error situations, for which function-specific error messages have not been defined.

2.2. Positioning Reference Signal (PRS)

For such positioning, a positioning reference signal (PRS) may be used. The PRS is a reference signal used to estimate the position of the UE.

A positioning frequency layer may include one or more PRS resource sets, each including one or more PRS resources.

Sequence Generation

A PRS sequence r(m) (m=0, 1, . . . ) may be defined by Equation 1.

$$r(m) = \frac{1}{\sqrt{2}}(1 - 2c(m)) + j\frac{1}{\sqrt{2}}(1 - 2c(m+1)) \quad \text{[Equation 1]}$$

In Equation 1, c(i) may be a pseudo-random sequence. A pseudo-random sequence generator may be initialized by Equation 2.

$$c_{init} = \left(2^{22}\left\lfloor\frac{n_{ID,seq}^{PRS}}{1024}\right\rfloor + 2^{10}(N_{symb}^{slot}n_{s,f}^{\mu} + l + 1) \right.$$
$$\left. (2(n_{ID,seq}^{PRS}\bmod 1024) + 1) + (n_{ID,seq}^{PRS}\bmod 1024)\right)\bmod 2^{31} \quad \text{[Equation 2]}$$

In Equation 2, $n_{s,f}^{\mu}$ may be a slot number in a frame in an SCS configuration $\mu$. A DL PRS sequence ID $n_{ID,seq}^{PRS} \in \{0, 1, \ldots, 4095\}$ may be given by a higher-layer parameter (e.g., DL-PRS-SequenceId). l may be an OFDM symbol in a slot to which the sequence is mapped.

Mapping to Physical Resources in DL a PRS Resource

A PRS sequence r(m) may be scaled by $\beta_{PRS}$ and mapped to REs $(k,l)_{p,\mu}$, specifically by Equation 3. $(k,l)_{p,\mu}$ may represent an RE (k, l) for an antenna port p and the SCS configuration $\mu$.

$$a_{k,l}^{(p,\mu)} = \beta_{PRS}r(m)$$

$$m=0, 1, \ldots$$

$$k = mK_{comb}^{PRS} + ((k_{offset}^{PRS} + k') \bmod K_{comb}^{PRS})$$

$$l = l_{start}^{PRS}, l_{start}^{PRS}+1, \ldots l_{start}^{PRS}+L_{PRS}-1 \quad \text{[Equation 3]}$$

Herein, the following conditions may have to be satisfied:
The REs $(k,l)_{p,\mu}$ are included in an RB occupied by a DL PRS resource configured for the UE;
The symbol l not used by any SS/PBCH block used by a serving cell for a DL PRS transmitted from the serving cell or indicated by a higher-layer parameter SSB-positionInBurst for a DL PRS transmitted from a non-serving cell;
A slot number satisfies the following PRS resource set-related condition;
$l_{start}^{PRS}$ is the first symbol of the DL PRS in the slot, which may be given by a higher-layer parameter DL-PRS-ResourceSymbolOffset. The time-domain size of the DL PRS resource, $L_{PRS} \in \{2, 4, 6, 12\}$ may be given by a higher-layer parameter DL-PRS-NumSymbols. A comb size $K_{comb}^{PRS} \in \{2, 4, 6, 12\}$ may be given by a higher-layer parameter transmissionComb. A combination $\{L_{PRS}, K_{comb}^{PRS}\}$ of $L_{PRS}$ and $K_{comb}^{PRS}$ may be one of $\{2, 2\}, \{4, 2\}, \{6, 2\}, \{12, 2\}, \{4, 4\}, \{12, 4\}, \{6, 6\}, \{12, 6\}$ and/or $\{12, 12\}$. An RE offset $k_{offset}^{PRS} \in \{0, 1, \ldots, K_{comb}^{PRS}-1\}$ may be given by combOffset. A frequency offset k' may be a function of $l-l_{start}^{PRS}$ as shown in Table 1.

TABLE 1

| $K_{comb}^{PRS}$ | Symbol number within the downlink PRS resource $1 - l_{start}^{PRS}$ | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 2 | 0 | 1 | 0 | 1 | 0 | 1 | 0 | 1 | 0 | 1 | 0 | 1 |
| 4 | 0 | 2 | 1 | 3 | 0 | 2 | 1 | 3 | 0 | 2 | 1 | 3 |
| 6 | 0 | 3 | 1 | 4 | 2 | 5 | 0 | 3 | 1 | 4 | 2 | 5 |
| 12 | 0 | 6 | 3 | 9 | 1 | 7 | 4 | 10 | 2 | 8 | 5 | 11 |

A reference point for k=0 may be the position of point A in a positioning frequency layer in which the DL PRS resource is configured. Point A may be given by a higher-layer parameter dl-PRS-PointA-r16.

Mapping to Slots in a DL PRS Resource Set

A DL PRS resource included in a DL PRS resource set may be transmitted in a slot and a frame which satisfy the following Equation 4.

$$(N_{slot}^{frame,\mu}n_f+n_{s,f}^{\mu}-T_{offset}^{PRS}-T_{offset,res}^{PRS})\bmod 2^{\mu}T_{per}^{PRS} \in \{iT_{gap}^{PRS}\}_{i=0}^{T_{rep}^{PRS}-1} \quad \text{[Equation 4]}$$

$N_{slot}^{frame,\mu}$ may be the number of slots per frame in the SCS configuration $\mu$. $n_f$ may be a system frame number (SFN). $n_{s,f}^{\mu}$ may be a slot number in a frame in the SCS configuration $\mu$. A slot offset $T_{offset}^{PRS} \in \{0, 1, \ldots, T_{per}^{PRS}-1\}$ may be given by a higher-layer parameter DL-PRS-ResourceSetSlotOffset. A DL PRS resource slot offset $T_{offset,res}^{PRS}$ may be given by a higher layer parameter DL-PRS-ResourceSlotOffset. A periodicity $T_{per}^{PRS} \in \{4, 5, 8, 10, 16, 20, 32, 40, 64, 80, 160, 320, 640, 1280, 2560, 5120, 10240\}$ may be given by a higher-layer parameter DL-PRS-Periodicity. A repetition factor $T_{rep}^{PRS} \in \{1, 2, 4, 6, 8, 16, 32\}$ may be given by a higher-layer parameter DL-PRS-ResourceRepetitionFactor. A muting repetition factor $T_{muting}^{PRS}$ may be given by a higher-layer parameter DL-PRS-MutingBitRepetitionFactor. A time gap $T_{gap}^{PRSl} \in \{1, 2, 4, 8, 16, 32\}$ may be given by a higher-layer parameter DL-PRS-ResourceTimeGap.

2.3. Protocol for Positioning Measurement

LTE Positioning Protocol (LPP)

Figure 6:
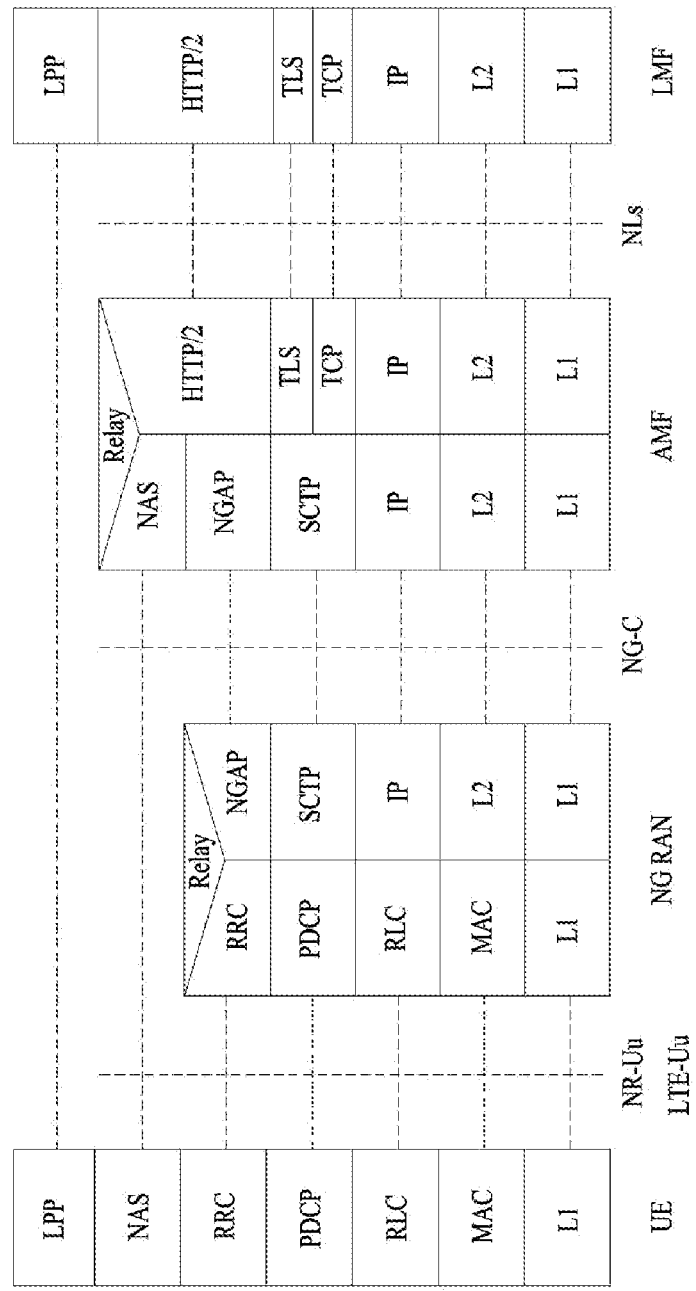
FIG. 6 is a diagram illustrating protocol layers for supporting LTE positioning protocol (LPP) message transmission, to which various embodiments are applicable.

FIG. 6 is a diagram illustrating exemplary protocol layers for supporting LPP message transmission, to which various embodiments are applicable. An LPP PDU may be transmitted in a NAS PDU between an AMF and a UE.

Referring to FIG. 6, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate abort of an LPP procedure, through an LPP message.

NR Positioning Protocol A (NRPPa)

Figure 7:
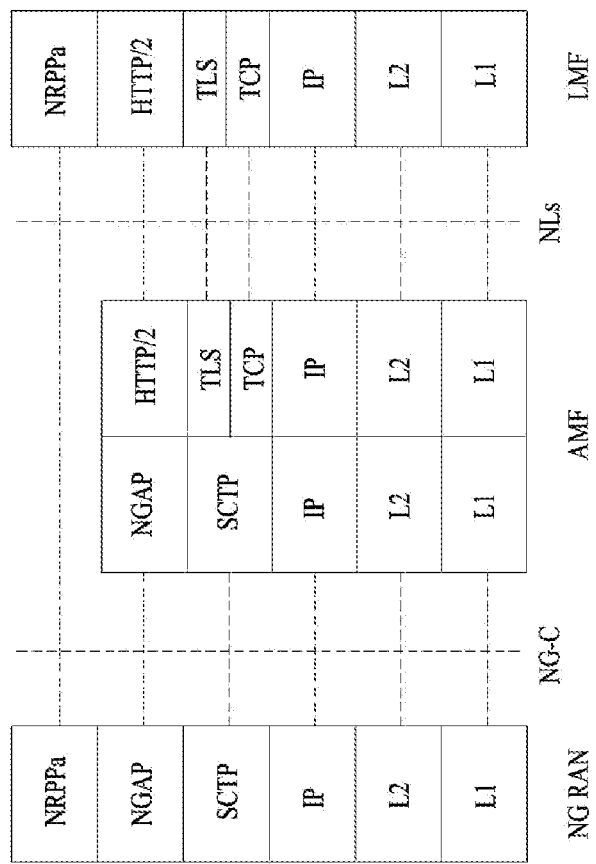
FIG. 7 is a diagram illustrating protocol layers for supporting NR positioning protocol a (NRPPa) protocol data unit (PDU) transmission, to which various embodiments are applicable.

FIG. 7 is a diagram illustrating exemplary protocol layers for supporting NRPPa PDU transmission, to which various embodiments are applicable.

NRPPa may be used to carry information between an NG-RAN node and an LMF. Specifically, NRPPa may carry an E-CID for measurement transferred from an ng-eNB to an LMF, data for support of an OTDOA positioning method, and a cell-ID and a cell position ID for support of an NR cell ID positioning method. An AMF may route NRPPa PDUs based on a routing ID of an involved LMF over an NG-C interface without information regarding related NRPPa transaction.

An NRPPa procedure for location and data collection may be divided into two types. The first type is a UE associated procedure for transfer of information regarding a particular UE (e.g., location measurement information) and the second type is a non-UE-associated procedure for transfer of information applicable to an NG-RAN node and associated TPs (e.g., gNB/ng-eNB/TP timing information). The two types may be supported independently or may be supported simultaneously.

2.4. Positioning Measurement Method

Positioning methods supported in the NG-RAN may include a Global Navigation Satellite System (GNSS), an OTDOA, an enhanced cell ID (E-CID), barometric sensor positioning, WLAN positioning, Bluetooth positioning, a terrestrial beacon system (TBS), uplink time difference of arrival (UTDOA) etc. Although any one of the positioning methods may be used for UE positioning, two or more positioning methods may be used for UE positioning.

OTDOA (Observed Time Difference of Arrival)

Figure 8:
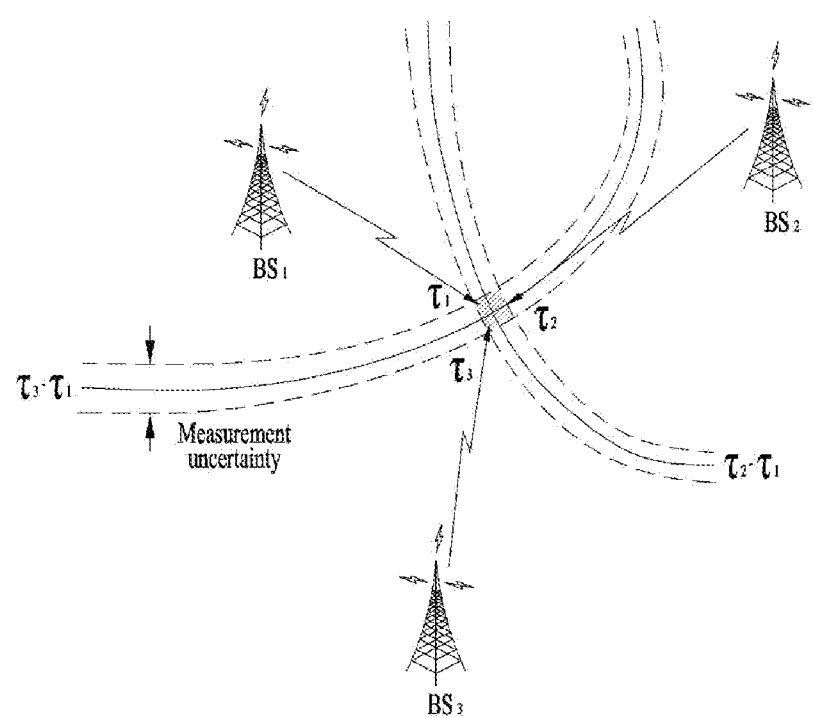
FIG. 8 is a diagram illustrating an observed time difference of arrival (OTDOA) positioning method, to which various embodiments are applicable.

FIG. 8 is a view illustrating an OTDOA positioning method, which may be used in various embodiments.

The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure time of arrival (ToA) of signals received from geographically distributed three or more TPs or BSs. For example, ToA for each of TP 1, TP 2, and TP 3 may be measured, and RSTD for TP 1 and TP 2, RSTD for TP 2 and TP 3, and RSTD for TP 3 and TP 1 are calculated based on three ToA values. A geometric hyperbola is determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, RSTD for two TPs may be calculated based on Equation 5 below.

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \quad \text{[Equation 5]}$$

where c is the speed of light, {xt, yt} are (unknown) coordinates of a target UE, {xi, yi} are (known) coordinates of a TP, and {x1, y1} are coordinates of a reference TP (or another TP). Here, (Ti-T1) is a transmission time offset between two TPs, referred to as "real time differences" (RTDs), and ni and nI are UE ToA measurement error values.

E-CID (Enhanced Cell ID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be obtained by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance (TADV), and/or AoA Here, $T_{ADV}$ may be divided into Type 1 and Type 2 as follows.

$T_{ADV}$ Type 1=(ng-eNB RX-TX time difference)+(UE E-UTRA RX-TX time difference)

$T_{ADV}$ Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

Multi RTT (Multi-Cell RTT)

Figure 9:
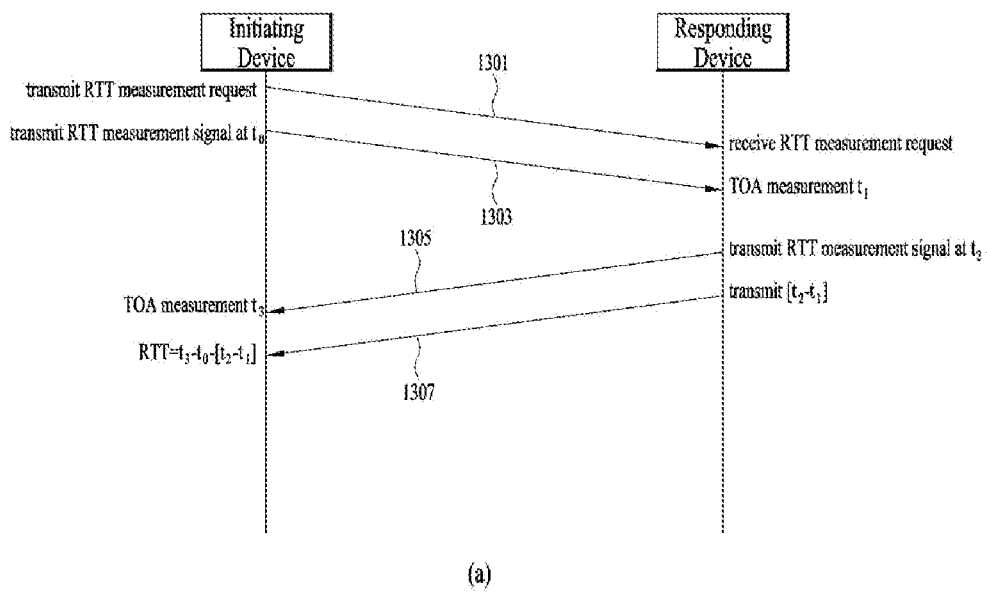
FIG. 9 is a diagram illustrating a multi-round trip time (multi-RTT) positioning method to which various embodiments are applicable.
Figure 9:
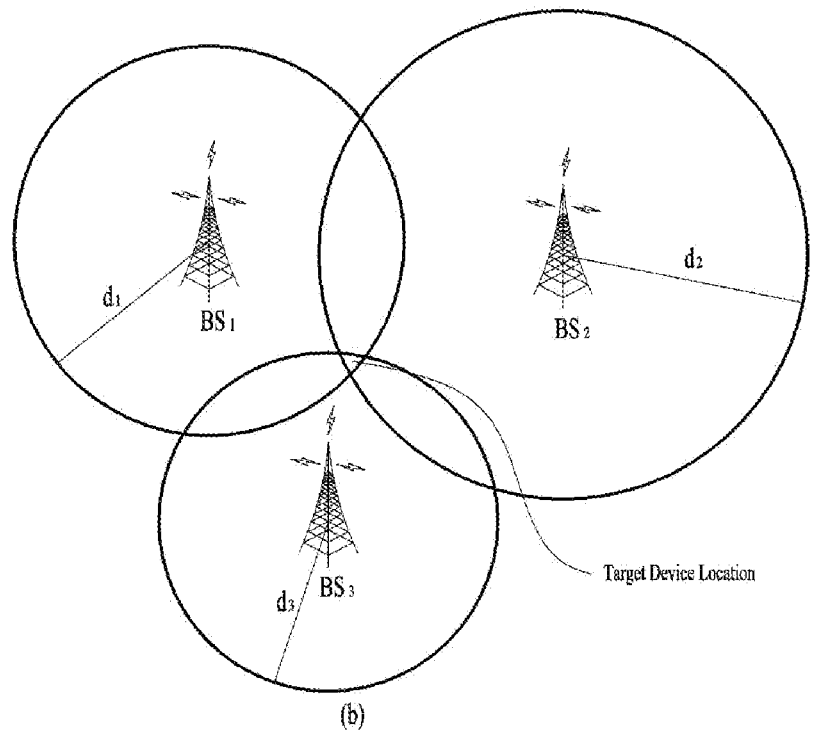

FIG. 9 is a diagram illustrating an exemplary multi-round trip time (multi-RTT) positioning method to which various embodiments are applicable.

Referring to FIG. 9(a), an exemplary RTT procedure is illustrated, in which an initiating device and a responding device perform ToA measurements, and the responding device provides ToA measurements to the initiating device, for RTT measurement (calculation). The initiating device may be a TRP and/or a UE, and the responding device may be a UE and/or a TRP.

In operation 1301 according to various embodiments, the initiating device may transmit an RTT measurement request, and the responding device may receive the RTT measurement request.

In operation 1303 according to various embodiments, the initiating device may transmit an RTT measurement signal at t0 and the responding device may acquire a ToA measurement t1.

In operation 1305 according to various embodiments, the responding device may transmit an RTT measurement signal at t2 and the initiating device may acquire a ToA measurement t3.

In operation 1307 according to various embodiments, the responding device may transmit information regarding [t2−t1], and the initiating device may receive the information and calculate an RTT by Equation 6. The information may be transmitted and received based on a separate signal or in the RTT measurement signal of operation 1305.

$$RTT = t_3 - t_0 - [t_2 - t_1] \quad \text{[Equation 6]}$$

Referring to FIG. 9(b), the RTT may correspond to a double-range measurement between the two devices. Positioning estimation may be performed from the information. Based on the measured RTT, d1, d2 and d3 may be determined, and a target device location may be determined to be the intersection of circles with BS1, BS2, and BS3 (or TRPs) at the centers and radiuses of d1, d2 and d3.

3. Various Embodiments

A detailed description will be given of various embodiments based on the above technical ideas. The afore-described contents of Section 1 and Section 2 are applicable to various embodiments described below. For example, operations, functions, terminologies, and so on which are not defined in various embodiments may be performed and described based on Section 1 and Section 2.

Symbols/abbreviations/terms used in the description of various embodiments may be defined as follows.

A/B/C: A and/or B and/or C
CSI-RS: channel state information reference signal
LMF: location management function
PRS: positioning reference signal
RS: reference signal
RSRP: reference signal received power
RTT: round trip time
Rx-Tx time difference: receive-transmit time difference
  1) UE Rx-Tx time difference: According to various embodiments, the UE Rx-Tx time difference may be defined as $T_{UE-RX} - T_{UE-TX}$. According to various embodiments, $T_{UE-RX}$ may be a UE receive timing of DL subframe (and/or frame/slot/symbol, etc.) #i from a positioning node, and may be defined by a path detected first in the time domain. According to various embodiments, $T_{UE-RX}$ may a UE transmit timing of UL subframe (and/or frame/slot/symbol, etc.) #j nearest the subframe (and/or frame/slot/symbol, etc.) #i received from the positioning node. (wherein #i and #j are indexes, each of which may have an integer value greater than or equal to 0). According to various embodiments, one or more DL PRS resources may be used to determine the start of a subframe (and/or frame/slot/symbol, etc.) of the first arrival path of the positioning node.
  2) gNB Rx-Tx time difference: According to various embodiments, the gNB Rx-Tx time difference may be defined as $T_{gNB-RX} - T_{gNB-TX}$. According to various embodiments, $T_{gNB-RX}$ may be a positioning node received timing of UL subframe (and/or frame/slot/symbol, etc.) #i including a sounding reference signal (SRS) associated with the UE, and may be defined by a path detected first in the time domain. According to various embodiments, $T_{gNB-TX}$ may be a positioning node transmit timing of DL subframe (and/or frame/slot/symbol, etc.) #j nearest subframe (and/or frame/slot/symbol, etc.) #i received from the UE (wherein #i and #j are indexes, each of which may have an integer value greater than or equal to of 0). According to various embodiments, one or more SRS resources for positioning may be used to determine the start of a subframe (and/or frame/slot/symbol, etc.) including the SRS. According to various embodiments, the gNB may be replaced with an eNB/base station (BS)/TRP or the like.

SRS: sounding reference signal
SS: synchronization signal
SSB: synchronization signal block
SS/PBCH: synchronization signal/physical broadcast channel
TA (T_ADV, $T_{ADV}$): timing advance/time advance
time stamp: For example, the UE may be configured/instructed to report time stamp information defining the UE measurement associated with the time stamp to the LMF/location server/gNB. For example, the UE may be configured/instructed to report the time stamp information regarding the time difference between the time when the measurement is acquired with a first DL RS and the time when the measurement is acquired with a second DL RS to the LMF/location server/gNB. For example, an NR-TimeStamp information element (IE) defining a UE measurement associated with the time stamp may be transmitted/received. As an example of the NR-TimeStamp, reference may be made to Table 2.

TABLE 2

- NR-TimeStamp
The IE NR-TimeStamp defines the UE measurement associated time stamp.

```
-- ASN1START
NR-TimeStamp-r16 ::= SEQUENCE {
    dl-PRS-ID-r16                          INTEGER (0..255),
    nr-PhysCellID-r16
    OPTIONAL,          -- Need ON          NR-PhysCellID-r16
    nr-CellGlobalID-r16
    OPTIONAL,          -- Need ON          NCGI-r15
    nr-ARFCN-r16
    OPTIONAL,          -- Need ON          ARFCN-ValueNR-r15
    nr-SFN-r16                             INTEGER (0..1023),
    nr-Slot-r16                            CHOICE {
                       scs15-r16           INTEGER (0..9),
                       scs30-r16           INTEGER (0..19),
                       scs60-r16           INTEGER (0..39),
                       scs120-r16          INTEGER (0..79)
    },
    ...
}
-- ASN1STOP
```

NR-TimeStamp field descriptions dl-PRS-ID
This field specifies the DL-PRS ID of the TRP for which the nr-SFN is applicable.
nr-ARFCN
This field specifies the ARFCN of the TRP associated with the dl-PRS-ID.
nr-SFN
This field specifies the NR system frame number for the time stamp.
nr-Slot
This field specifies the NR slot number within the NR system frame number indicated by nr-SFN for the time stamp.

ToA: time of arrival
TRP: transmission and reception point (TP: transmission point)
Tx: transmit/transmission, Rx: receive/reception
In the description of various embodiments, Σ may denote a summation. For example, $$\sum_{i=m}^{n} a_i = a_m + a_{m+1} + a_{m+2} + \ldots + a_{n-1} + a_n,$$

where i may be the index of summation, m may be the lower bound of summation, n may be the upper bound of summation, where i may be incremented by 1 from m to n.

In the description of various embodiments, a sample may be a measurement value for positioning and provided to apply a filtering process. For example, when the transmission period of the PRS is 2 ms and the time window (which may be configured/indicated by the UE/BS/location server and will be described later in detail) is 20 ms, ten samples based on each PRS may be acquired in the time window. Based on the filtering process being applied to the ten samples, a filtered measurement value may be acquired.

In the description of various embodiments, the PRS may be replaced with another DL reference signal (e.g., SSB/channel state information reference signal (CSI-RS), etc.).

In the description of various embodiments, the network may be a BS/location server/LMF.

In the description of various embodiments, the BS may be understood as a comprehensive term including a remote radio head (RRH), an eNB, a gNB, a TP, a reception point (RP), and/or a relay transmitting DL data to a UE in a wireless network/integrated access and backhaul (IAB).

In the description of various embodiments, a panel of a UE may be a plurality of antenna elements and/or a group/set of antenna elements mounted on the UE. For example, the panel of the UE may be a specific physical panel/antenna group. For example, the panel of the UE may be a logical bundle of several antennas as one group. In the description of various embodiments, the panel of the UE may be expressed as not only a "panel" but also an "antenna group," "antenna element," and the like. According to various embodiments, antenna elements may be grouped and assigned a specific identifier (ID) to separate/distinguish antenna groups. According to various embodiments, multiple antenna elements may be distributed into one or more groups, and a specific ID may be assigned to each of the one or more groups, such that the one or more groups are mutually identified/distinguished by the specific ID.

In the description of various embodiments, a UE-assisted positioning method (and/or a network-based positioning method) may be related to a method by which a UE calculates/obtains and reports a UE location/positioning-related measurement (e.g., a value a value used by the gNB/(location) server/LMF for UE positioning, such as, for example, a measurement value for one or more of RSTD, AoA, AoD, RTT, and ToA), and a network node (e.g., the gNB/server/LMF, etc.) receiving the report calculates/obtains location/positioning information regarding the UE. For example, this may be contrasted with a UE-based positioning method in which the UE directly calculates/obtains its own location/positioning information (UE-based positioning method). Various embodiments may be applied to both the UE-assisted positioning method and the UE-based positioning method.

In the description of various embodiments, "exceeding/greater than or equal to A" may be replaced with "greater than or equal to/exceeding A."

In the description of various embodiments, "less than/less than or equal to B" may be replaced with "less than or equal to/less than B."

Unless specifically stated otherwise, all operations of UEs mentioned in various embodiments may be configured/indicated/directed by the network through explicit and/or implicit signaling (e.g., higher layer/lower layer signaling, etc.).

For example, in order to perform UE positioning according to the multi-RTT method and/or the ECID method, the UE Rx-Tx time difference measurement by the UE and/or the gNB Rx-Tx time difference measurement by the gNB may be needed. For example, the location server/LMF may measure the RTT using a measurement value.

However, for example, since the gNB and the UE acquire and/or transmit the measurement to the location server/LMF on their own bases, the time when the measurement is acquired may be inaccurate/unclear. For example, considering that the UE is movable, the difference between the acquisition time of the UE Rx-Tx time difference measurement and the acquisition time of the gNB Rx-Tx time difference measurement may affect the accuracy of UE positioning.

Various embodiments may be related to a method for configuring/indicating a TA and/or a UE positioning measurement method using a filtered value of the UE Rx-Tx time difference measurement and/or the gNB Rx-Tx time difference measurement. For example, the filtering may be for an average value, but various embodiments are not limited thereto.

Various embodiments may relate to a method for aligning the acquisition time of the UE Rx-Tx time difference measurement with the acquisition time of the gNB Rx-Tx time difference measurement in order to improve the UE positioning accuracy when the UE positioning is performed according to the multi-RTT method and/or the ECID method. For example, it may be considered that the acquisition time of the UE Rx-Tx time difference measurement is aligned with the acquisition time of the gNB Rx-Tx time difference measurement through the above-described filtering. The multi-RTT method and/or the ECID method is an example of the positioning method to which various embodiments are applicable, and various embodiments are not limited thereto.

For example, the network may configure/indicate, for the UE, a measurement filtering time window for acquiring the UE Rx-Tx time difference measurement. Also, for example, in consideration of mobility of the UE, the UE may request/recommend that the gNB acquire the gNB Rx-Tx time difference measurement using the same window as the measurement filtering time window used for the UE to acquire the UE Rx-Tx time difference measurement.

For example, the measurement filtering time window may be a measurement averaging time window, but various embodiments are not limited thereto.

According to various embodiments, in order to improve positioning accuracy, the UE and/or the gNB may be configured to use the same measurement filtering rule (e.g., a measurement averaging rule) for an Rx-Tx time difference for the periodic PRS resource and/or SRS resource. For example, a method/signaling for this configuration may be provided.

Figure 10:
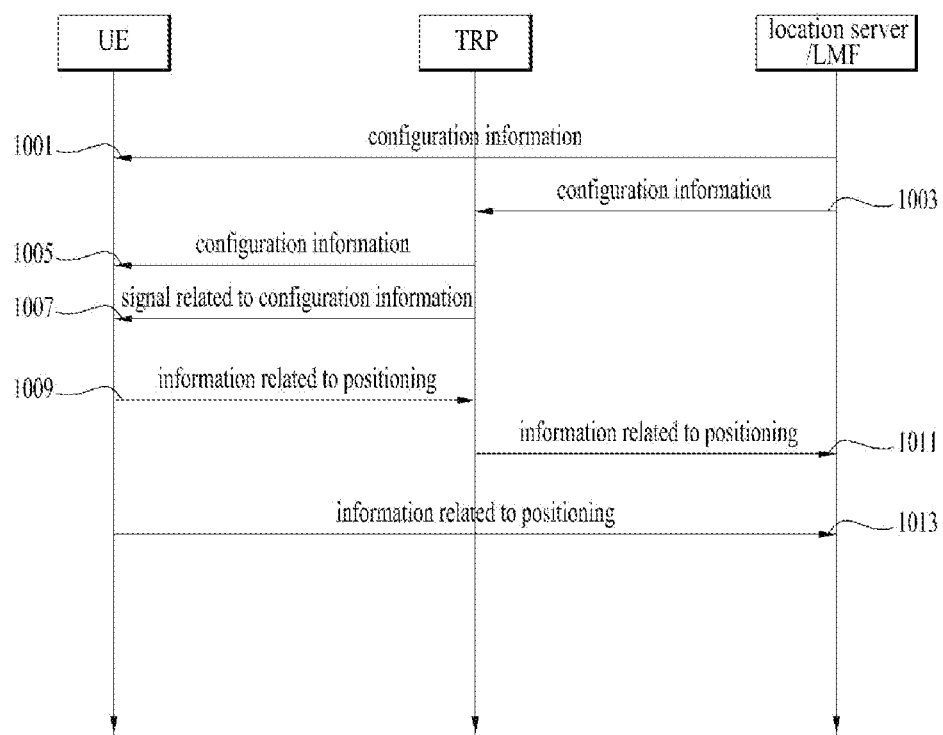
FIG. 10 is a simplified diagram illustrating a method of operating a UE, a transmission and reception point (TRP), a location server, and/or a location management function (LMF) according to various embodiments.

FIG. 10 is a simplified diagram illustrating a method of operating a UE, a TRP, a location server, and/or an LMF according to various embodiments.

Referring to FIG. 10, the location server and/or the LMF may transmit configuration information to the UE, and the UE may receive the configuration information in operation 1001 according to various embodiments.

The location server and/or the LMF may transmit reference configuration information to the TRP, and the TRP may receive the reference configuration information in operation 1003 according to various embodiments. The TRP may transmit the reference configuration information to the UE, and the UE may receive the reference configuration information in operation 1005 according to various embodiments. In this case, operation 1601 according to various embodiments may be skipped.

On the contrary, operations 1003 and 1005 according to various embodiments may be skipped. In this case, operation 1001 according to various embodiments may be performed.

That is, operation 1001 according to various embodiments and operations 1003 and 1505 according to various embodiments may be selectively performed.

In operation 1007 according to various embodiments, the TRP may transmit a signal related to the configuration information to the UE, and the UE may receive the signal related to the configuration information. For example, the signal related to the configuration information may be a signal for positioning the UE.

In operation 1009 according to various embodiments, the UE may transmit a positioning-related signal to the TRP, and the TRP may receive the positioning-related signal. In operation 1011 according to various embodiments, the TRP may transmit the positioning-related signal to the location server and/or the LMF, and the location server and/or the LMF may receive the positioning-related signal.

In operation 1013 according to various embodiments, the UE may transmit the positioning-related signal to the location server and/or the LMF, and the location server and/or the LMF may receive the positioning-related signal. In this case, operations 1009 and 1011 according to various embodiments may be skipped.

On the contrary, operation 1013 may be skipped. In this case, operations 1011 and 1013 according to various embodiments may be performed.

That is, operations 1009 and 1011 according to various embodiments and operation 1513 according to various embodiments may be selectively performed.

According to various embodiments, the positioning-related signal may be obtained based on the configuration information and/or the signal related to the configuration information.

Figure 11:
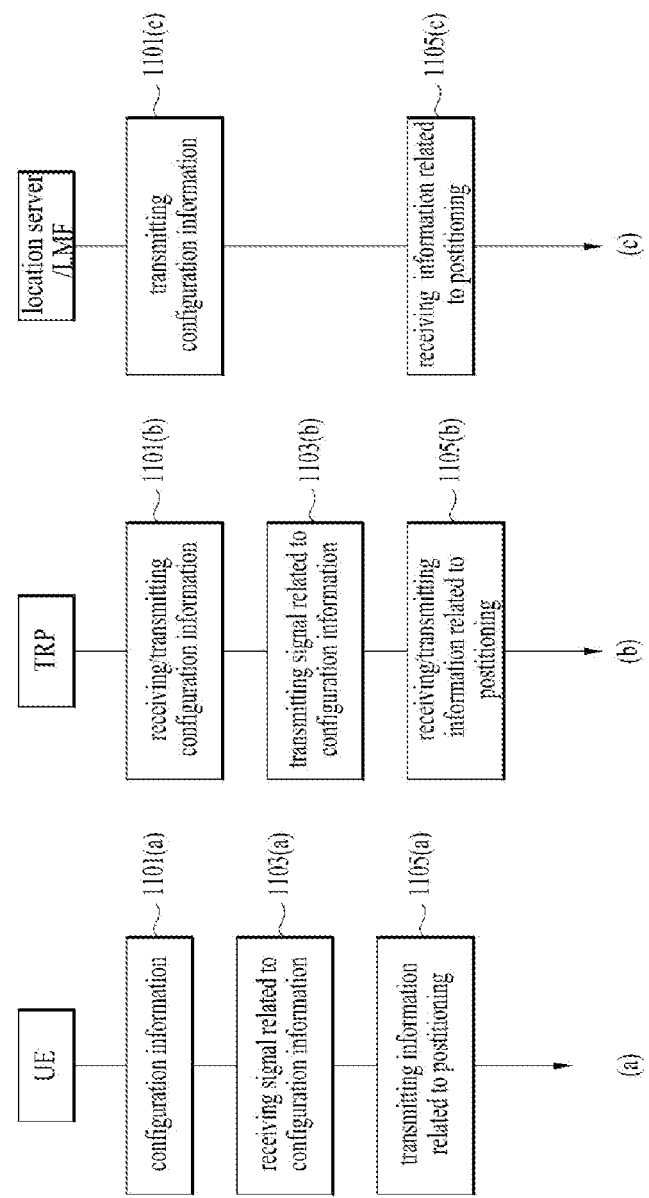
FIG. 11 is a simplified diagram illustrating a method of operating a UE, a TRP, a location server, and/or an LMF according to various embodiments.

FIG. 11 is a simplified diagram illustrating a method of operating a UE, a TRP, a location server, and/or an LMF according to various embodiments.

Referring to FIG. 11(a), the UE may receive configuration information in operation 1101(a) according to various embodiments.

In operation 1103(a) according to various embodiments, the UE may receive a signal related to the configuration information.

In operation 1105(a) according to various embodiments, the UE may transmit information related to positioning.

Referring to FIG. 11(b), the TRP may receive configuration information from the location server and/or the LMF and transmit the received configuration information to the UE in operation 1101(b) according to various embodiments.

In operation 1103(b) according to various embodiments, the TRP may transmit a signal related to the configuration information.

In operation 1105(b) according to various embodiments, the TRP may receive information related to positioning and transmit the received information related to positioning to the location server and/or the LMF.

Referring to FIG. 11(c), the location server and/or the LMF may transmit configuration information in operation 1101(c) according to various embodiments.

In operation 1105(c) according to various embodiments, the location server and/or the LMF may receive information related to positioning.

For example, the configuration information may be understood as being related to reference configuration (information) and/or one or more pieces of information that the location server and/or the LMF and/or the TRP transmits to/configures for the UE, and/or as being the reference configuration (information) and/or the one or more pieces of information that the location server and/or the LMF and/or the TRP transmits to/configures for the UE, in the following description of various embodiments.

For example, the signal related to positioning may be understood as a signal related to at least one piece of information reported by the UE and/or as a signal including the at least one piece of information reported by the UE, in the following description of various embodiments.

For example, BS, gNB, or cell may be replaced with TRP, TP, or any device playing the same role, in the following description of various embodiments.

For example, location server may be replaced with server, LMF, or any device playing the same role, in the following description of various embodiments.

More specific operations, functions, terms, and so on in operations according to various embodiments may be performed and described based on various embodiments described later. The operations according to various embodiments are exemplary, and one or more of the above-described operations may be omitted according to specific details of each embodiment.

A detailed description will be given below of various embodiments. Unless contradicting each other, the various embodiments described below may be combined fully or partially to form other various embodiments, which may be clearly understood by those skilled in the art.

Figure 12:
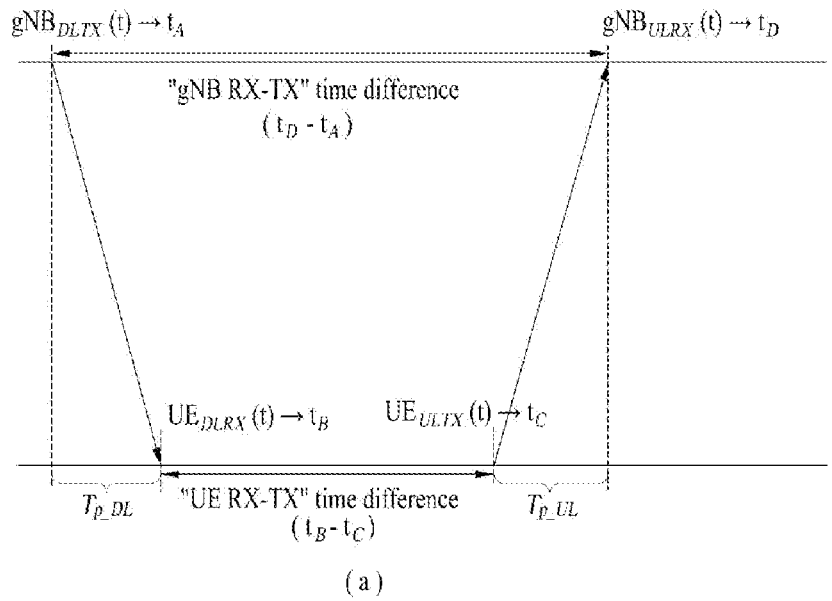
FIG. 12 is a diagram illustrating an example of an Rx-Tx time difference measurement acquisition method according to various embodiments.
Figure 12:
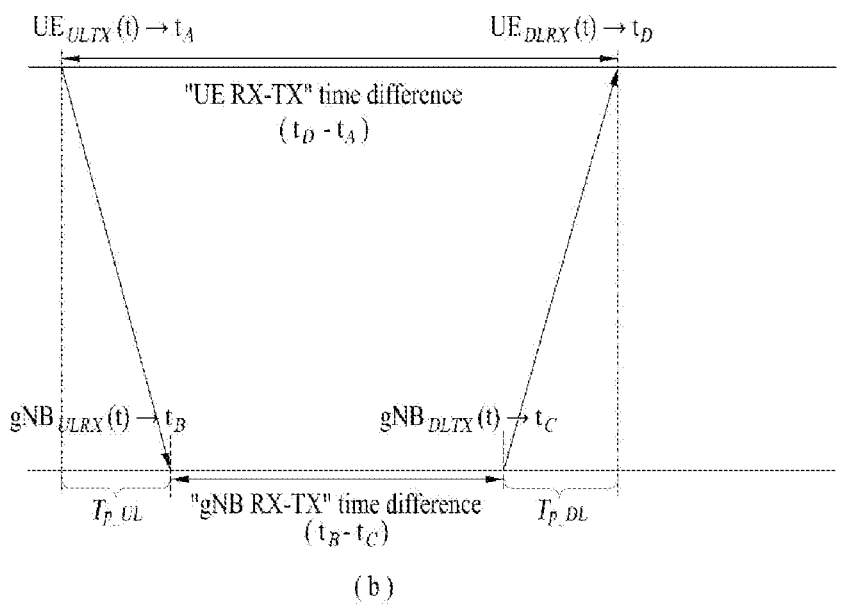

FIG. 12 is a diagram illustrating an example of an Rx-Tx time difference measurement acquisition method according to various embodiments.

Referring to FIG. 12-(a), signaling for acquisition of Rx-Tx time difference measurement according to various embodiments may be started with the gNB.

According to various embodiments, a first signal (e.g., DL RS for positioning) may be transmitted by the gNB at a transmission time $t_A$ (gNB$_{DLTX}$(t)), and may be received by the UE at a reception time $t_B$ (UE$_{DLRX}$(t)). According to various embodiments, there may be a time difference $T_{p\_DL}$ between the reception time $t_B$ and the transmission time $t_A$ related to the first signal. According to various embodiments, $T_{p\_DL}$ may be understood as a DL propagation time.

According to various embodiments, a second signal (e.g., UL RS for positioning) may be transmitted by the UE at a transmission time $t_C$ (UE$_{ULTX}$(t)), and may be received by the gNB at a reception time $t_D$ (gNB$_{ULRX}$(t)). According to various embodiments, there may be a time difference $T_{p\_UL}$ between the reception time $t_D$ and the transmission time $t_C$ related to the second signal. According to various embodiments, $T_{p\_UL}$ may be understood as a UL propagation time.

According to various embodiments, the UE Rx-Tx time difference may be acquired as a time difference $t_B$-$t_C$ between the reception time $t_B$ related to the first signal and the transmission time $t_C$ related to the second signal.

According to various embodiments, the gNB Rx-Tx time difference may be acquired as a time difference $t_D$-$t_A$ between the transmission time $t_A$ related to the first signal and the reception time $t_D$ related to the second signal.

According to various embodiments, TA (T_ADV) may be defined as in Equation 7 below.

$$T\_ADV = gNB\ RX\text{-}TX\ time\ difference + UE\ RX\text{-}TX\ time\ difference \quad [\text{Equation 7}]$$

According to various embodiments, Equation 7 may be rearranged as Equation 7-1.

$$T_{ADV} = (gNB_{ULRX}(t) - gNB_{DLTX}(t)) + (UE_{DLRX}(t) - UE_{ULTX}(t)) \quad [\text{Equation 7-1}]$$

According to various embodiments, the RTT/TA may be calculated/acquired from the sum of the gNB Rx-Tx time difference and the UE Rx-Tx time difference.

According to various embodiments, UE Rx-Tx time difference measurement may be reported for positioning.

Referring to FIG. 12-(b), signaling for acquiring Rx-Tx time difference measurement according to various embodiments may be started with the UE.

According to various embodiments, a first signal (e.g., UL RS for positioning) may be transmitted by the UE at a transmission time $t_A$ (UE$_{ULTX}$(t)), and may be received by the gNB at a reception time $t_B$ (gNB$_{ULRX}$(t)). According to various embodiments, there may be a time difference $T_{p\_UL}$ between the reception time $t_B$ and the transmission time $t_A$ related to the first signal. According to various embodiments, $T_{p\_UL}$ may be understood as a UL propagation time.

According to various embodiments, a second signal (e.g., DL RS for positioning) may be transmitted by the gNB at a transmission time $t_C$ (gNB$_{DLTX}$(t)), and may be received by the UE at a reception time $t_D$ (UE$_{DLRX}$(t)). According to various embodiments, there may be a time difference $T_{p\_DL}$ between the reception time $t_D$ and the transmission time $t_C$ related to the second signal. According to various embodiments, $T_{p\_DL}$ may be understood as a DL propagation time.

According to various embodiments, the UE Rx-Tx time difference may be acquired as a time difference $t_D$-$t_A$ between the transmission time $t_A$ related to the first signal and the reception time $t_D$ related to the second signal.

According to various embodiments, the gNB Rx-Tx time difference may be acquired as a time difference $t_B$-$t_C$ between the reception time $t_B$ related to the first signal and the transmission time $t_C$ related to the second signal.

According to various embodiments, Equation 7 may be rearranged as Equation 7-2.

$$T_{ADV} = (gNB_{ULRX}(t) - gNB_{DLTX}(t)) + (UE_{DLRX}(t) - UE_{ULTX}(t)) \quad [\text{Equation 7-2}]$$

According to various embodiments, the RTT/TA may be calculated/acquired from the sum of the gNB Rx-Tx time difference and the UE Rx-Tx time difference.

According to various embodiments, UE Rx-Tx time difference measurement may be reported for positioning.

According to various embodiments, in order to improve the accuracy of the TA configured/indicated to the UE, the gNB and/or UE may consider a specific filtering process to compensate for an instantaneous measurement error with respect to a received signal. For example, the specific filtering process may involve taking the average of the obtained measurement values.

Filtered Measurements for TA Configuration

According to various embodiments, an estimation error of the UE/gNB may be compensated for by the UE/gNB by filtering (e.g., averaging).

Method #0

According to various embodiments, the gNB may use a specific filtering process for each of the UE Rx-Tx time difference measurement value and/or the gNB Rx-Tx time difference measurement value to set/determine a TA value for the UE and/or to determine/use the DL propagation time and/or UL propagation time. As an example of the filtering process, averaging may be considered.

According to various embodiments, the UL propagation time and the DL propagation time may be measured, respectively, and a value obtained by adding the propagation times (e.g., a value obtained considering RTT for which the UL signal is transmitted by the UE and received by the gNB, and the DL signal is transmitted by the gNB and received by the UE) may be used as a TA value.

Referring back to FIG. 12, according to various embodiments, as an example of a method of acquiring the value obtained by adding the UL propagation time and the DL propagation time, the sum of the gNB Rx-Tx time difference measurement value and the UE Rx-Tx time difference measurement value may be acquired as the value. According to various embodiments, in consideration of the filtering process, specific filtering (e.g., averaging) may be performed on gNB Rx-Tx time difference measurements acquired from measurement performed multiple times, and/or perform specific filtering (e.g., averaging) on UE Rx-Tx time difference measurements acquired from measurement performed multiple times. According to various embodiments, the TA may be used to set/indicate a round time value by adding the values obtained through the filtering.

According to various embodiments, the filtering process may be represented as Equation 8.

$$F(T_{ADV}) = F(gNB_{ULRX}(t) - gNB_{DLTX}(t)) + F(UE_{DLRX}(t) - UE_{ULTX}(t)) \quad [\text{Equation 8}]$$

$gNB_{ULRX}(t)$: UL reception time of gNB
$gNB_{DLTX}(t)$: DL transmission time of gNB
$UE_{DLRX}(t)$: DL reception time of UE
$UE_{ULTX}(t)$: UL transmission time of UE
$T_{ADV}$: TA value/RTT value
F(x): Filtering function. A function that outputs a value obtained by applying filtering of the input variable x.

For example, when averaging is considered as the filtering process, the filtering process may be represented as Equation 8-1.

$$E(T_{ADV}) = E(gNB_{ULRX}(t) - gNB_{DLTX}(t)) + E(UE_{DLRX}(t) - UE_{ULTX}(t))$$ [Equation 8-1]

$gNB_{ULRX}(t)$: UL reception time of gNB
$gNB_{DLTX}(t)$: DL transmission time of gNB
$UE_{DLRX}(t)$: DL reception time of UE
$UE_{ULTX}(t)$: UL transmission time of UE
$T_{ADV}$: TA value/RTT value
E(x): Averaging function. A function that outputs the average of the input variable x. In the following description of various embodiments, a case where E(x) is applied is described as an example. However, in the following description of various embodiments, E(x) may be replaced with F(x).

Proposal #0-1: UE Location Estimation Purpose

According to various embodiments, for a specific DL RS resource (e.g., a DL PRS resource, a CSI-RS resource and/or an SS/PBCH block) and/or a specific UL RS resource (e.g., a UL SRS resource and/or PRACH), the UE may be configured/instructed by the gNB and/or location server/LMF to report a filtered value of "UE Rx-Tx time difference measurement" for "$(UE_{DLRX}(t) - UE_{ULTX}(t))$" using a specific filter.

According to various embodiments, information on a specific filter may be configured/indicated to the UE by the gNB. For example, the information on the specific filter may be configured/indicated from a higher layer signal (e.g., an RRC signal and/or a medium access control-control element (MAC-CE)). For example, the information on the specific filter may include information on a filter coefficient that may be considered/used and/or information on an averaging filter.

For example, the UE may report $E(UE_{DLRX}(t) - UE_{ULTX}(t))$.

According to various embodiments, the gNB may obtain the sum of the DL propagation time and UL propagation time by adding the value of $E(UE_{DLRX}(t) - UE_{ULTX}(t))$ reported by the UE and the value of $E(gNB_{ULRX}(t) - gNB_{DLTX}(t))$ calculated/acquired by the gNB for the gNB reception-transmission time difference measurement, and may determine TA based on the sum. For example, TA may be determined as a value satisfying $E(T_{ADV})$. According to various embodiments, the gNB may use the same filtering information configured/indicated to the UE for the gNB Rx-Tx time difference measurement value. For example, the gNB may acquire filtered gNB reception-transmission time difference measurement (e.g., $E(gNB_{ULRX}(t) - gNB_{DLTX}(t))$) by applying filtering to gNB reception-transmission time difference measurement measured using the same information on the specific filter configured/indicated to the UE.

According to various embodiments, the gNB may set/indicate the filtered TA (e.g., average TA) as a TA value to the UE.

For example, the gNB may set/indicate a filtered TA value to the UE.

As another example, the gNB may set/indicate filtered $T_{ADV} + \Delta$ as TA, rather than setting/indicating the filtered TA value to the UE. This operation may be adding, for example, a specific value other than the propagation time to consider the UL DL switching time. In other words, for example, the value of $\Delta$ may be a UL DL switching time of the gNB and/or UE, and/or may be a value related/corresponding to the UL DL switching time of the UE, and/or may be a value including the UL DL switching time of the UE.

As an example for introduction of the average TA according to various embodiments, use of a specific periodic DL RS resource and periodic UL RS resource may be considered. For example, the UE may receive a configuration/indication of a pair of a specific DL RS resource (e.g., CSI-RS resource, SS/PBCH block, PRS resource, etc.) periodically transmitted from the gNB/location server/LMF and a specific UL RS resource (e.g., SRS resource, etc.) periodically transmitted by the UE, and/or may be configured/instructed to report the average of UE Rx-Tx time difference measurements based on measurement performed several times.

According to various embodiments, the signaling procedures may be configured as follows:

1) According to various embodiments, the UE may report a filtering value for the Rx-Tx time difference measurement to the gNB.

For example, the UE may transmit/report the filtered value for the Rx-Tx time difference measurement to the gNB as a measurement used for TA configuration regardless of positioning.

For example, the gNB may determine the value of filtered UL propagation time+DL propagation time by adding the value reported by the UE and the filtered value for the gNB Rx-Tx time difference value, and configure/indicate TA to the UE.

2) According to various embodiments, the UE may report a filtering value for the Rx-Tx time difference measurement to the location server.

For example, the gNB/location server/LMF may configure/indicate a filtering coefficient for the filter process to the UE.

For example, the UE may report the measurement to the location server/LMF.

For example, the location server/LMF may inform the gNB of a measurement value.

For example, when the location server/LMF configures/indicates filtering information to the UE, the location server may transmit the information to the gNB.

For example, the gNB may configure/indicate the TA to the UE based on the information received from the UE and/or the location server/LMF.

Proposal #0-2

According to various embodiments, the UE may receive, from the gNB/location server/LMF, a configuration/indication of a pair of the DL RS resource and UL RS resource to be used to calculate/obtain the UE Rx-Tx time difference measurement and/or the number N of samples (e.g., DL RS resources, UL RS resources: for example, the number of DL RS resources and/or UL RS resources) of measurement for calculating/acquiring the average of UE Rx-Tx time difference measurements.

According to various embodiments, the information may help improve the accuracy of measurement of the location of the UE based on the ECID and/or the multi-cell RTT as well as TA configuration/indication of the gNB.

As a specific example of Proposal #0-1 and Proposal #0-2 according to the above-described various embodiments, the UE may transmit/report the average value of UE Rx-Tx time measurements to the gNB/location server/LMF using Signal-Measurement-Information (SignalMeasurementInformation) (and/or data signal container) IE (information element)). For example, such operation of the UE may be configured/indicated by the gNB/location server/LMF.

According to various embodiments, as the average of the UE Rx-Tx time difference measurements, an average of N (>1) points of time of transmission of a specific DL RS resource (e.g., a CSI-RS resource, SS/PBCH block resource, PRS resource, etc.) transmitted periodically and/or semi-persistently may be considered.

According to various embodiments, the location server/LMF may use a specific SRS resource transmission time and/or UE Rx-Tx time difference measurement information between multiple DL signal paths to measure the location of the UE by utilizing multiple paths between the UE and the cell/gNB/TRP.

Proposal #0-3: Avg. Considering the n-Th Arrival Signal Path

According to various embodiments, the UE may report/transmit the average of UE Rx-Tx time difference measurements for the transmission timing of a specific UL RS resource and an n-th arrival signal path (where n>0, natural number) of a specific DL RS resource (e.g., PRS resource, etc.).

Additionally/alternatively, according to various embodiments, the UE may report/transmit the average of UE Rx-Tx time difference measurements for the transmission timing of a specific UL RS resource and a total of K (>0) signal paths, including the first signal path of the DL RS resource to the location server.

For example, the UE may deliver/transmit the information in an information container (e.g., "NR-Multi-RTT-SignalMeasurementInformation") that carries signal measurement information for multi-cell RTT. For example, such operation of the UE may be configured/indicated by the gNB/location server/LMF.

Figure 13:
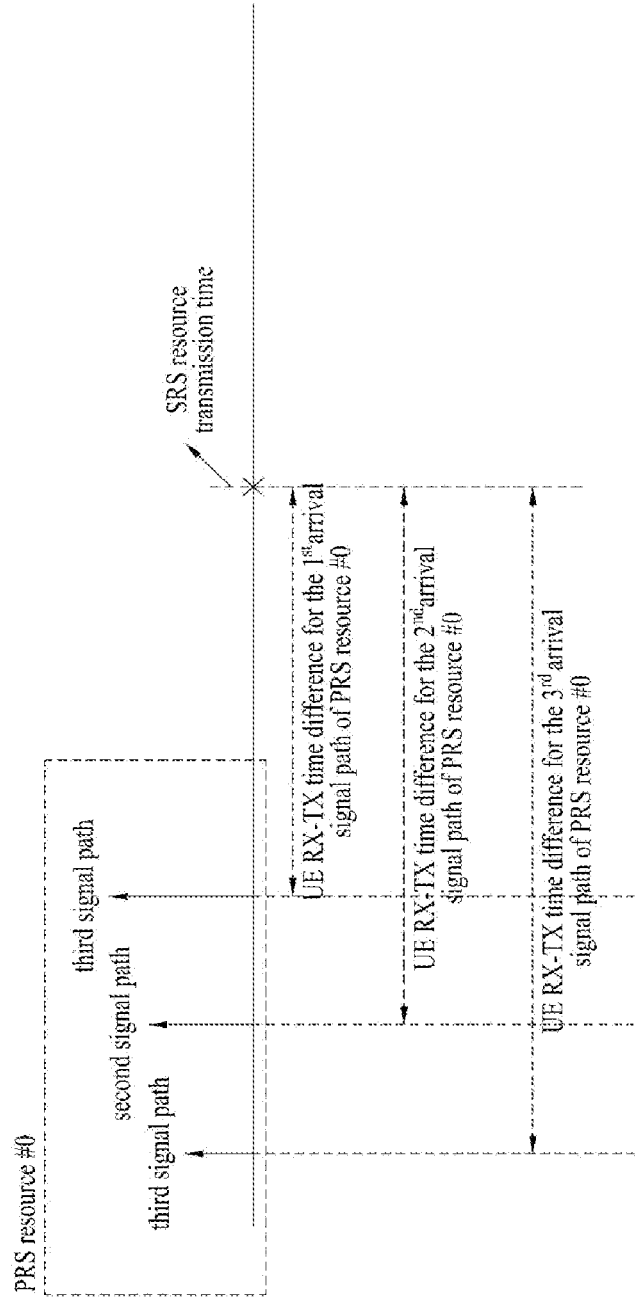
FIG. 13 is a diagram illustrating an example of Rx-Tx time difference measurement for multiple signal paths according to various embodiments.

FIG. 13 is a diagram illustrating an example of Rx-Tx time difference measurement for multiple signal paths according to various embodiments.

Referring to FIG. 13, for example, there may be three multiple signal paths for specific PRS resource #0. For example, a first signal path, a second signal path, and a third signal path may be configured, and may correspond to different signal strengths, respectively. For example, the signal strength may increase from the first signal path to the second signal path to the third signal path.

For example, there may be Rx-Tx time difference measurement for each of the three multiple signal paths of PRS resource #0. For example, there may be UE Rx-Tx time difference measurement in consideration of the n-th arrival signal path of PRS resource #0 and the SRS resource.

For example, based on the SRS resource transmission timing and the third signal path, UE Rx-Tx time difference measurement for the first arrival signal path of PRS resource #0 may be acquired.

For example, based on the SRS resource transmission timing and the second signal path, UE Rx-Tx time difference measurement for the second arrival signal path of PRS resource #0 may be acquired.

For example, based on the SRS resource transmission timing and the first signal path, UE Rx-Tx time difference measurement for the third arrival signal path of PRS resource #0 may be acquired.

According to various embodiments, the gNB and the UE may measure UL and DL propagation times through bidirectional transmission/reception, and may configure/indicate TA based thereon.

Additionally/alternatively, according to various embodiments, only the UL propagation time may be measured through a UL signal (e.g., SRS, RACH, etc.) transmitted by the UE, and TA may be configured/indicated based thereon. In this case, for example, it may be considered that the UE reports the average considering both the UL signal transmission time and the DL signal reception time and that the UE reports the average and/or measurement error information for each of the transmission/reception times.

Proposal #1-1

According to various embodiments, for a specific UL RS resource (e.g., SRS resource, SRS resource for positioning, PRACH, etc.), the UE may be configured/instructed by the gNB/location server/LMF to report a filtered value (e.g., average value, etc.) of a UL transmission timing (and/or TA) based on a TA value set/indicated for the specific UL RS resource.

Additionally/alternatively, according to various embodiments, the UE may be configured/instructed to report error information such as an average error in consideration of the fluctuation/variation of the UL transmission timing of the SRS resource.

For example, the UE may not always use the set/indicated TA value as it is. For example, as the DL reception timing measured by the UE changes, the UE may appropriately change the UL transmission timing based on the TA value set/indicated by the gNB. Additionally/alternatively, there may be a transmission timing error (known as jittering, etc.) caused by, for example, hardware characteristics of the UE. According to various embodiments, this information may be taken into account/considered to assist the network in calculating/acquiring the propagation time or the like.

Proposal #1-2

According to various embodiments, for a specific DL RS resource (e.g., a DL CSI-RS resource, a DL PRS resource, an SS/PBCH block, etc.), the UE the UE may be configured/instructed by the gNB/location server/LMF to report a filtered value (e.g., average value, etc.) of a DL reception timing (/DL reception time) (and/or a DL propagation timing (/DL propagation time)) for the specific DL RS resource.

Additionally/alternatively, according to various embodiments, the UE may be configured/instructed to report error information such as an average error in consideration of fluctuation/variation of the UL transmission timing.

According to various embodiments, the UE may report the DL reception timing (and/or DL propagation time) to the gNB to allow the gNB to acquire the DL propagation time information. For example, considering that an error occurring due to multiple signal paths and/or the signal power of the first arriving signal path is below a certain level and thus may be regarded as noise, these various embodiments may have advantages.

Proposal #2

According to various embodiments, the gNB/location server/LMF may request/instruct the UE to report single shot-based (e.g., single measurement/single sample-based) timing measurement (e.g., TOA/propagation time/UE Rx-Tx time difference measurement, etc.). According to various embodiments, the gNB may make the request to the UE through dynamic signaling (e.g., DCI and/or medium access control-control element (MAC-CE), etc.).

According to various embodiments, the gNB/location server/LMF may configure/instruct the UE to acquire M (>0) timing multiple measurements and report N (>0) timing measurements to the gNB/location server/LMF. For example, the timing measurements may include TOA/propagation time/Rx-Tx time difference measurements.

Additionally/alternatively, according to various embodiments, the gNB/location server/LMF may configure/instruct the UE to exclude, when the UE fails to acquire a measurement (e.g., timing measurement) from a specific DL RS resource, the measurement that the UE fails to receive/acquire when performing a filter process for measurements acquired at multiple time instances (e.g., when calculating/acquiring the average for the measurements acquired at multiple time instances). This configuration may be applied in general to various embodiments of the filtering process.

According to various embodiments, whether measurement acquisition for a specific DL RS resource has failed may be determined based on a specific criterion such as a criterion that reference signal received power (RSRP) and/or signal to noise ratio (SNR) higher than or equal to a certain level/threshold is not guaranteed. According to various embodiments, the specific criterion may be configured/indicated from a network and/or may be pre-configured/defined by default. For example, when the RSRP for the DL RS resource is lower than or equal to a specific RSRP level, the UE may automatically determine that the measurement acquisition for the DL RS resource has failed.

Proposal #2-1

According to various embodiments, the UE may be configured/instructed to report a filtered value (e.g., average value, etc.) for timing measurement from the gNB/location server/LMF. However, for example, when a specific event occurs and/or a specific criterion is not met, the UE may report a timing measurement value acquired at a specific time to the gNB/location server/LMF without the filtering process.

For example, as an example of the specific event and/or specific criterion, there may be a case where the number of effective measurement samples (e.g., the number of measurement samples whose reception has not failed) is not beyond a certain level/certain threshold. For example, a criterion for the percentage of effective measurement samples among the entire acquired measurement samples may be defined/configured/indicated.

According to various embodiments, when the value of deviation/variance of the measurement sample is greater than or equal to a certain level/threshold (and/or the correlation between the measurement samples is lower than or equal to a certain level/threshold), the UE may cancel/ignore/drop the filtering process. According to various embodiments, a deviation/variance/correlation value may be set/indicated from a network.

For example, depending on a fading channel environment between the UE and the cell/gNB/TRP, the UE may fail to acquire a measurement for a specific DL RS resource. For example, it may be undesirable for such timing measurement samples to be used when a filtered value (e.g., average) is acquired/calculated.

Additionally/alternatively, for example, when the same DL RS resource that is periodically/semi-statically transmitted is received multiple times, the timing measurement quality may vary depending on the channel environment or the like.

Accordingly, there may be a case when it is rather undesirable in terms of measurement accuracy that all timing measurement samples are used and a specific one timing measurement value is determined/reported. According to various embodiments, in this case, the filtering process may be canceled/ignored/dropped.

Issues and Effects (Measurement Filtering/Averaging)

For example, the UE may report the UE Rx-Tx time difference measurement to the gNB/location server/LMF, and the gNB may report the gNB/TRP Rx-Tx time difference measurement to the location server/LMF. For example, in this case, criteria for the time when the UE and/or the gNB acquire each measurement and/or a duration for which filtering (e.g., averaging, etc.) is performed for the UE and/or the gNB to report a determined value may not be clear.

Therefore, for example, when the RTT value is calculated/acquired using the UE Rx-Tx time difference measurement and/or the gNB/TRP Rx-Tx time difference measurement reported by the UE and/or gNB, an accuracy issue may be raised. For example, the UE may calculate/obtain the UE Rx-Tx time difference measurement based on the most recent measurement sample and report the same to the gNB/location server/LMF, and the gNB may calculate/obtain an average for the gNB/TRP Rx-Tx time difference measurement acquired for a relatively long time (compared to the case of the UE) and report the same to the location server/LMF. For example, such operation of the gNB may be considered to increase the accuracy of the measurement by acquiring and reporting the same measurement multiple times. However, considering the mobility of the UE, the gNB/TRP Rx-Tx time difference measurement averaged for such a long time may not be suitable to be finally used for calculation of the RTT measurement.

Accordingly, the above-described various embodiments may be effective in terms of improving positioning accuracy. For example, in terms of improvement of UE positioning accuracy, it may be considerably important for the gNB/location server/LMF to set/indicate the filtered value for the "UE Rx-Tx time difference measurement" of the UE according to the above-described various embodiments to the UE.

Hereinafter, more specific and/or additional embodiments will be described. One or more of the various embodiments described below may be combined with one or more of the various embodiments described above and/or constitute a single embodiment.

Method #1 (gNB->UE (More Details with Examples))

According to various embodiments, the gNB may configure/indicate a criterion for determination of the "Rx-Tx time difference measurement" to the UE such that the UE and the gNB may report the Rx-Tx time difference measurement value using the same rule/criterion.

For example, by setting a specific filter coefficient in the UE, a criterion for determining a reporting measurement value to be reported by the UE at a specific time point (e.g., the current time point) may be configured.

Additionally/alternatively, for example, the gNB may configure/indicate an average window/filtering window (time and/or frequency window) to the UE for measurements averaging/measurements filtering.

According to various embodiments, for example, a filter process such as Equation 9 may be considered.

$$A_n = (1-a) \times A_{n-1} + a \times M_n \quad \text{[Equation 9]}$$

For example, $M_n$ may be a timing measurement result (e.g., UE Rx-Tx time difference measurement) most recently obtained before a reporting instance (and/or reporting time).

For example, $A_{n-1}$ may be an old filtered measurement result.

For example, $A_0$ may be set to $M_1$ when the first measurement result is obtained.

For example, a may be a filter coefficient (and/or a weighting factor). For example, the filter coefficient may be set/indicated from the gNB/location server/LMF.

According to various embodiments, when a positioning measurement to be reported to the network is determined/ acquired through the above-described process, the extent to which a measurement acquired in the past is reflected and reported may be configured/indicated.

According to various implementations, the filter process may be generalized as Equation 9-1.

$$\sum_{n=1}^{L} R_n a_n \quad \text{[Equation 9-1]}$$

For example, L>0 may be a parameter that is set/indicated to consider L recently acquired measurements. For example, it may be L measurements recently acquired before the reporting instance (and/or reporting time).

For example, $a_n$ may be a filter coefficient (and/or a weighting factor). For example, the filter coefficient may be set/indicated by the gNB/location server/LMF.

For example, $R_n$ may be the n-th obtained timing measurement result (e.g., UE Rx-Tx time difference measurement) before the reporting instance and/or the reporting time.

For example, $R_1$ and $R_L$ may be the most recently acquired measurement and the first acquired measurement before the reporting instance and/or the reporting time. For example, $R_L$ may be a measurement most recently acquired before the reporting instance and/or reporting time, and $R_1$ may be the first measurement acquired before the reporting instance and/or reporting time. As an opposite example, $R_1$ may be a measurement most recently acquired before the reporting instance and/or reporting time, and $R_L$ may be the first measurement acquired before the reporting instance and/or reporting time. For example, the first acquired measurement among the L measurements may be $R_1$ (or $R_L$), and the latest acquired measurement may be $R_L$ (or $R_1$). Additionally/alternatively, for example, a measurement acquired at a time closest to the reporting instance and/or reporting time among the L measurements may be $R_1$ (or $R_L$), and a measurement acquired at the earliest time before the reporting instance and/or reporting time point may be $R_L$ (or $R_1$). For example, the remaining measurements may be sequentially indexed from 2 to n−1 according to the acquisition time. The range of the index is exemplary, and may be, for example, 0 to L−1 for L samples.

Method #2 (UE->BS/Location Server/LMF)

According to various embodiments, the UE may determine a rule/criterion for determining a positioning measurement (e.g., UE Rx-Tx time difference measurement) value to be reported to the gNB/location server/LMF, and report the same to the gNB/location server/LMF.

Additionally/alternatively, according to various embodiments, the UE may request/recommend a "preferred" and/or appropriate rule/criterion to the gNB/location server. According to various embodiments, the UE may autonomously determine/select a rule/criterion, and may request/recommend that the gNB/location server use the same rule/criterion.

For example, the rule/criterion may be a specific filtering process/coefficient and/or may be a time-window for filtering (e.g., averaging).

For example, the example in Method #1 according to the various embodiments described above may be considered. For example, the UE may inform the gNB/location server/LMF of a filter coefficient $a_n$ or a. Additionally/alternatively, for example, the UE may indicate an average window in order to inform the gNB/location server/LMF that it has determined the average of the positioning measurements acquired for a specific time period as a value to be reported. In this case, for example, the gNB/location server/LMF may acquire a positioning measurement using the same window as the average window (and/or filtering window) indicated by the UE (e.g., it may acquire a positioning measurement based on filtering being applied to samples within the filtering window).

According to various embodiments, the UE may report to the gNB/location server/LMF a criterion/rule used to determine the positioning measurement to report to the gNB/location server/LMF using the measurement acquired multiple times. Thus, the gNB may also determine and report positioning measurement (e.g., gNB Rx Tx time difference measurement) to the location server/LMF by applying the same criterion/rule.

For example, considering the mobility of the UE, it may be more reasonable for the UE to determine a filtering window (e.g., average window) in consideration of its own movement speed/position change, etc., than for the network to configuring a rules/criterion for the UE.

For example, when the UE is stationary, the UE may report an average value for the measurements acquired over a long time (relatively long time/beyond a certain threshold) to improve measurement accuracy. On the other hand, for example, when the speed/velocity of the UE is high, the UE may report the most recently acquired measurement value, thereby improving accuracy.

Method #3 (Location Server/LMF->gNB/UE)

According to various embodiments, the location server/LMF may configure/indicate a measurement determination rule/criterion to the gNB/UE.

According to various embodiments, to allow the UE and the gNB to report an Rx-Tx time difference measurement value to the location server/LMF using the same rule/criterion, the location server/LMF may configure/indicate, to the gNB and/or the UE, a criterion/rule for determining an "Rx-Tx time difference measurement" to be reported to the location server/LMF by the gNB and the/or the UE.

For example, the location server/LMF may configure/indicate a criterion/rule for determining a reporting measurement value for the UE to report at a specific time (e.g., current time), by setting a specific same filter coefficient to the gNB and the UE. Additionally/alternatively, a filtering window (e.g., average window) (time and/or frequency window) may be configured/indicated for, for example, measurement filtering (e.g., measurement averaging).

Method #4 (Fixed Rule)

According to various embodiments, the UE and the gNB may use a preconfigured/predetermined rule/criterion such that the UE and the gNB may report an Rx-Tx time difference measurement value to the location server/LMF using the same rule/criterion. For example, the UE and the gNB may use a preconfigured/predetermined rule/criterion such that the most recently acquired measurement (sample) and/or the average of the N most recent measurement samples are reported.

Proposal #3 (UE->UE)

It may be important to measure relative/absolute location of a vehicle-to-everything (V2X) system and/or other mobile UEs to which various embodiments are applicable.

For example, an RTT between the UEs may be obtained and calculated in order to measure the relative position between UEs. For example, when the distance is acquired/calculated by measuring a propagation time/TOA for a signal transmitted by a specific UE in one direction, the accuracy thereof may be lower than that of RTT measurement due to a sync error between UEs.

Figure 14:
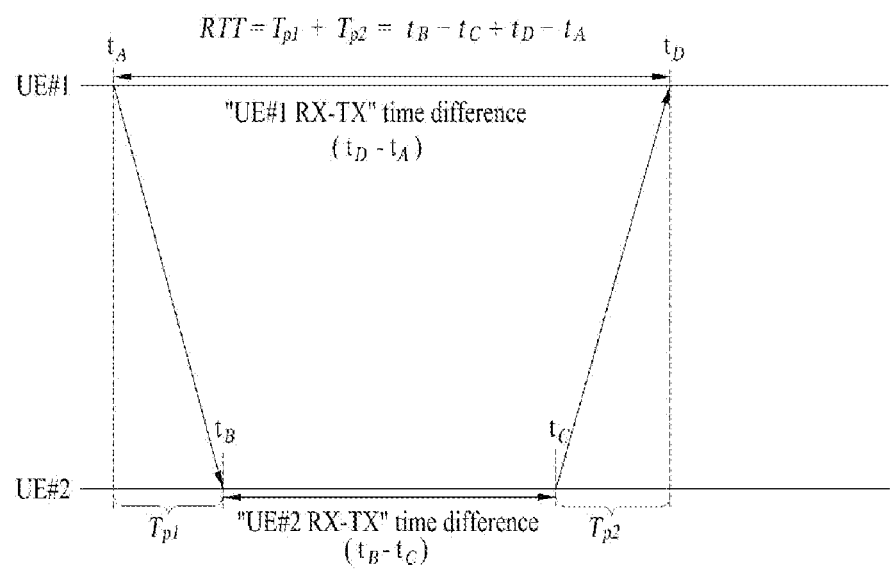
FIG. 14 is a diagram illustrating an example of an Rx-Tx time difference measurement acquisition method according to various embodiments.

FIG. 14 is a diagram illustrating an example of an Rx-Tx time difference measurement acquisition method according to various embodiments.

Referring to FIG. 14, according to various embodiments, UE #1 may first transmit a specific RS (e.g., sidelink (SL) RS (resource), first signal) to UE #2, and UE #2 may receive the same and transmit a specific RS (e.g., SL RS (resource), second signal) to UE #1, such that each of UE #1 and UE #2 may acquire an Rx-Tx time difference measurement. For example, the SL RS may be intended for positioning.

According to various embodiments, the first signal may be transmitted from UE #1 at a transmission time $t_A$ and may be received by UE #2 at a reception time $t_B$. According to various embodiments, there may be a time difference $T_{p1}$ between the reception time $t_B$ and the transmission time $t_A$ related to the first signal. According to various embodiments, $T_{p1}$ may be understood as a first SL propagation time.

According to various embodiments, the second signal may be transmitted from UE #2 at a transmission time $t_C$ and may be received by UE #1 at a reception time $t_D$. According to various embodiments, there may be a time difference $T_{p2}$ between the reception time $t_D$ and the transmission time $t_C$ related to the second signal. According to various embodiments, $T_{p2}$ may be understood as a second SL propagation time.

According to various embodiments, the UE #1 Rx-Tx time difference may be obtained as a time difference $t_D-t_A$ between the transmission time $t_A$ related to the first signal and the reception time $t_D$ related to the second signal.

According to various embodiments, the UE #2 Rx-Tx time difference may be obtained as a time difference $t_B-t_C$ between the reception time $t_B$ related to the first signal and the transmission time $t_C$ related to the second signal.

According to various embodiments, the RTT may be obtained as Equation 10.

$$RTT=T_{p1}+T_{p2}=t_B-t_C+t_D-t_A \qquad \text{[Equation 10]}$$

According to various embodiments, each UE (UE #1 and UE #2) may report (each) Rx Tx time difference measurement value to the network.

According to various embodiments, each UE may transmit/report the Rx-Tx time difference measurement value thereof to a counterpart (target) UE. For example, when UE #1 is to find a relative position with respect to UE #2, UE #2 may inform UE #1 of the UE #2 Rx-Tx time difference measurement value. For example, when UE #2 is to find a relative position with respect to UE #1, UE #1 may inform UE #2 of the UE #1 Rx-Tx time difference measurement value. According to various embodiments, such operation of a UE may be indicated/configured from the network. Additionally/alternatively, according to various embodiments, such operation of the UE may be requested/indicated by another UE.

According to various embodiments, the RS used to find the relative position between UEs may not be limited to the SL RS. For example, UE #1 (or UE #2) may transmit a UL signal, and UE #2 (or UE #1) may receive/detect the same to measure a propagation time.

For example, it may be assumed that UE #1 calculates/obtains RTT. For example, when a filtering window (e.g., average window) for the UE #1 Rx-Tx time difference measurement value (e.g., $t_D-t_A$ in FIG. 14) determined by UE #1 to calculate/obtain an RTT is different from a filtering window (e.g., average window) used to determine the Rx-Tx time difference measurement value reported by UE #2 to UE #1, finally, RTT measurement accuracy may be lowered. According to various embodiments, UE #2 may inform UE #1 of a criterion/rule used to determine the Rx-Tx time difference measurement value to be reported. Additionally/alternatively, according to various embodiments, UE #2 may inform the gNB/location server/LMF of the criterion/rule used to determine the Rx-Tx time difference measurement value to be reported, and the gNB/location server/LMF may deliver the above information to UE #1. According to various embodiments, for example, the same filtering window used may be the same, and thus RTT measurement accuracy may be improved.

According to various embodiments, examples of the rule/criterion may include a filtering window (and/or average window) (e.g., a time and/or frequency window) for filtering (e.g., averaging) measurements and filtering coefficient information.

As an opposite example, when UE #2 calculates/obtains an RTT, UE #1 may provide corresponding information to UE #2.

According to various embodiments, when the gNB/location server/LMF directly uses the information regarding the Rx-Tx time difference of UE #1 and UE #2, the gNB/location server/LMF may configure/instruct each UE to report Rx-Tx time difference information.

According to various embodiments, the UE Rx-Tx time difference information may be associated with a specific RS resource. According to various embodiments, when the Rx-Tx time difference is reported, the employed RX beam information/Rx panel information/Tx beam information/Tx panel information and/or time-stamp information may be reported together. According to various embodiments, the target to which the UE sends a report may be a network and/or another UE. According to various embodiments, when the UE reports the time-stamp together, the operation may be interpreted as reporting a valid time of the Rx-Tx time difference measurement reported to the counterpart UE together.

In the above description of the various embodiments, the UE Rx-Tx time difference measurement has been mentioned as an example of the measurement that the UE indicates to the other UE. However, various embodiments are not limited thereto. Various embodiments may be applied not only to the UE Rx-Tx time difference but also to timing measurement for positioning (e.g., TOA/propagation time/propagation time for n-th arrival signal (where n is a natural number))/RSRP/SNR, etc. For example, when UE #2 obtains a propagation time/TOA measurement using the RS transmitted from UE #1 to UE #2, and UE #1 measures a relative distance/position based thereon, UE #2 may provide UE #1 with the time average (filtering) window/filtering information used by UE #2, in consideration of the movement velocity/movement speed/position change of UE #2. For example, UE #1 may infer/interpret/obtain the valid time of the positioning measurement information provided from UE #2 based thereon.

Additional Proposals

According to various embodiments, the gNB may configure/indicate two or more multiple criteria to the UE as criteria for determining a measurement to be reported. For example, the multiple criteria may include multiple filtering windows (e.g., multiple average windows), multiple filters, and multiple filtering coefficients. According to various embodiments, the UE may report multiple Rx-Tx time difference measurement values according to the configured criteria.

Various embodiments may relate to network time synchronization issues. For example, they may relate to a method of measuring/compensating for a network time synchronization error more accurately by effective use of the RSTD and/or (UE/gNB) Rx-Tx time difference and/or RTT measurement.

For example, the network synchronization error may cause degradation of accuracy in DL-TDOA and/or UL-TDOA positioning. For example, the network synchronization error may cause degradation of RSTD measurement accuracy.

For example, it may be difficult for different cells/TRPs/gNBs to transmit signals at the exact same time. For example, a correction below a certain level may be implemented. However, in general, there may be a time synchronization difference between different cells/TRPs/gNBs. For example, in a UE position measurement method (e.g., DL-TDOA, etc.) based on a relative difference in arrival time of signals transmitted by different cells/TRPs/gNBs, the UE positioning accuracy/performance may vary greatly depending on the magnitude of the cell/TRP/gNB synchronization error.

According to various embodiments, RTT, and/or UE/gNB Rx-Tx time difference, and/or RSTD measurement may be used to address the issue of a synchronization error between cells/TRPs/gNBs.

Figure 15:
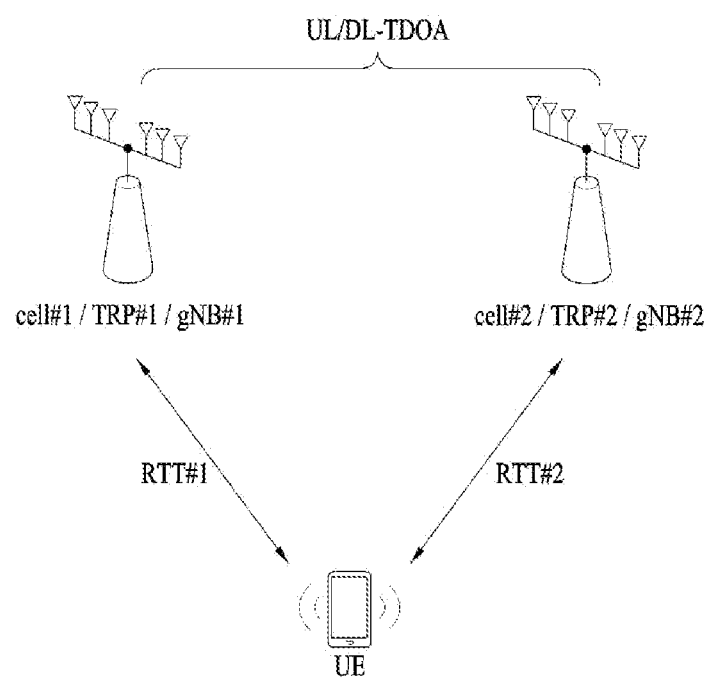
FIG. 15 is a diagram illustrating an example of a positioning measurement method according to various embodiments.

FIG. 15 is a diagram illustrating an example of a positioning measurement method according to various embodiments.

Referring to FIG. 15, for example, assuming that the DL propagation time is the same as the UL propagation time, half of the RTT may be considered as the propagation time/delay between the UE and a specific cell/TRP/gNB. For example, considering the RTT measurement and RSTD measurement for the UE and each cell #1/TRP #1/gNB #1 and cell #2/TRP #2/gNB #2, Equation 11 may be obtained.

$$(RTT\ \#1 - RTT\ \#2) \times 0.5 - RSTD_{12} = \delta \quad \text{[Equation 11]}$$

For example, $\delta$ may represent a synchronization error between cell #1/TRP #1/gNB #1 and cell #2/TRP #2/gNB #2. For example, the RSTD measurement (corresponding to $RSTD_{12}$) value obtained by the UE may include the value of the synchronization error between cell #1/TRP #1/gNB #1 and cell #2/TRP #2/gNB #2, and the RTT measurement is not affected by the synchronization error. Accordingly, the error may be represented as Equation 11. That is, for example, in Equation 11, $RSTD_{12}$ may be an (ideal) RSTD measurement value that does not include the synchronization error, and may be understood as the RSTD measurement acquired by the UE, separated from the synchronization error $\delta$.

For example, Equation 11 may be rearranged as Equation 11-1 in terms of measurement acquired by the UE and the gNB.

$$((UE\ RX-Tx)_1 + (gNB\ RX-Tx)_1 - ((UE\ RX-Tx)_2 + (gNB\ RX-Tx)_2)) \times 0.5 = RSTD_{12} + \delta \quad \text{[Equation 11-1]}$$

For example, $(UE\ RX-Tx)_j$ may be a UE Rx-Tx time difference measurement value between the UE and Cell #j/TRP #j/gNB #j.

For example, $(gNB\ RX-Tx)_j$ may be a gNB Rx-Tx time difference measurement value between the UE and Cell #j/TRP #j/gNB #j.

For example, $RSTD_{ij}$ may be an RSTD measurement for Cell #i/TRP #i/gNB #i and Cell #j/TRP #j/gNB #j.

According to various embodiments, the UE and the gNB may report the following information to the location server/LMF.

UE reporting: $(UE\ RX-Tx)_1$, $(UE\ RX-Tx)_2$, $RSTD_{12}$
Cell #1/TRP #1/gNB #1 reporting: $(gNB\ RX-Tx)_1$
Cell #2/TRP #2/gNB #2 reporting: $(gNB\ RX-Tx)_2$ For example, when the UE and the gNB report measurements obtained at different times, the relationship of Equation 11 and/or Equation 11-1 may not be established. For example, when the time at which the value of RTT #1 is obtained differs from the time at which the value of RTT #2 is obtained by several seconds, the relationship of Equation 11 and/or Equation 11-1 may not be established, considering the mobility of the UE.

For example, in order for the relationship of Equation 11 and/or Equation 11-1 to be established, the criteria for determining the positioning measurement reported by the gNB and the UE may need to be the same.

Proposal ##: Measurement Reporting Rule

According to various embodiments, the UE may be configured/instructed from the network to perform RSTD measurement and/or acquire and/or report a UE Rx-Tx time difference measurement for each of gNB #1/gNB #2 to the network for PRS resource #1 transmitted by gNB #1 (wherein gNB #1 may be replaced with cell #1/TRP #1 in the description of various embodiments) and PRS resource #2 transmitted by gNB #2 (wherein gNB #2 may be replaced by cell #2/TRP #2 in the description of various embodiments). For example, in case of UE Rx-Tx time difference, a UL SRS resource and/or RACH occasion may be configured/indicated in addition to the PRS resources and/or together with the PRS resources.

According to various embodiments, for reporting of the UE Rx-Tx time difference measurement and/or reporting of RSTD measurement to gNB #1/gNB #2, the gNB/location server/LMF may configure/indicate a specific rule/reference for acquiring measurement to the UE/gNB.

According to various embodiments, the rule/criterion may be configured to measure/guarantee/compensate for a synchronization error between cells/gNBs/TRPs.

According to various embodiments, the configuration may be generalized to a situation of resolving the issue of synchronization errors between a target UE and K gNBs. For gNB Rx-Tx time difference measurement that K (>=1) cells/gNBs/TRPs report to the location server/LMF for a specific UE, the location server/LMF may set/indicate a specific rule/criterion for acquiring/calculating the measurement to the cells/gNBs/TRPs.

Additionally/alternatively, according to various embodiments, the UE Rx-Tx time difference measurement acquired by the UE for K (>=1) cells/gNBs/TRPs, the gNB/location server/LMF may set/indicate a specific rule/criterion for acquiring/calculating the measurement to the UE.

According to various embodiments, the location server/LMF may set/indicate the "same rule/criterion" to the gNB and the UE.

Additionally/alternatively, according to various embodiments, a specific cell/gNB/TRP may provide the rule/criterion for measurement acquisition/calculation to the other K-1 cells/gNBs/TRPs and the UE.

According to various embodiments, an example of the rule/criterion may be specific filtering configuration information. For example, the specific filtering configuration information may include configuration information regarding filter coefficients.

According to various embodiments, measurements acquired based on the same rule/criterion may be used, and a measurement to be reported may be determined. For example, one or more of the following operations may be considered:

For example, for PRS resource #1 transmitted by gNB #1 and PRS resource #2 transmitted by gNB #2, the Rx-Tx time difference measurement and/or RSTD obtained based on the N (>=1) most recently received samples may be configured/indicated to be reported.

For example, K cells/gNBs/TRPs and/or the UE be configured/indicated by the gNB/location server/LMF to report an Rx-Tx time difference measurement value and/or RSTD using the N (>=1) most recently received/obtained measurement samples.

For example, the gNB/location server/LMF may configure/indicate a specific time-domain window (e.g., a filtering window (e.g., average window)) such that K cells/gNBs/TRPs and/or the UE may determine a reporting value (e.g., report a filtered value (average value)) using the measurement obtained during a specific period of time.

For example, according to various embodiments, in order to measure/compensate a network synchronization error without separate signaling, such that an increase in signaling overhead between the location server/LMF and the gNB/UE according to configuration of a specific rule/criterion may be resolved, the operation of the UE may be defined/determined such that the RSTD measurement and the UE Rx-Tx time difference measurement reported by the UE are measurements obtained at the most recent time. According to various embodiments, the gNB Rx-Tx time difference measurement reported by the gNB may also be defined/determined to be the measurement obtained at the most recent time. Such operation of the UE and the gNB according to the various embodiments is merely one example, and the operation of the UE/gNB for determining/calculating the reported measurement value may be determined in various ways.

In the description of various embodiments, a measurement/sample obtained at a (most) recent time may mean a measurement/sample obtained later (latest) in the time domain among a plurality of measurements/samples, and/or mean a measurement/sample obtained at a time close (closest) to a (measurement) reporting time in the time domain among a plurality of measurements/samples. This meaning may be generally applied to various embodiments.

According to Proposal ### (the measurement reporting rule) according to the above-described various embodiments, when the UE and the gNB report the positioning measurement they acquired to the location server/LMF, the obtained measurement value may be different from the reported measurement value because the reporting bit is not infinite (the quantity of bits available for reporting is limited). In consideration of this difference, for example, it may be more accurate for the UE and/or the gNB to find the synchronization error δ by directly using the measurements they have obtained.

1) gNB->UE

According to various embodiments, the gNB may transmit a gNB Rx-Tx time difference measurement value to the UE, and the UE may obtain/calculate the RTT and determine the value of δ based on the obtained RSTD.

According to various embodiments, the gNB(s) may provide a gNB(s) Rx-Tx time difference measurement value for the target UE, and inform the UE of a specific DL RS (e.g., PRS, SSB, CSI-RS, etc.) resource and/or UL RS (e.g., SRS) resource on which the gNB(s) Rx-Tx time difference measurement value has been obtained.

For example, the UE may be informed that two specific cells/TRPs/gNBs have recently calculated/obtained the value using the average of N (>=1) recent samples. For example, the UE may calculate the UE Rx-Tx time difference measurement value and/or RSTD value for each of the (two specific) cells/TRPs/gNBs using the same rule/criterion as provided. For example, finally, the UE may calculate a synchronization error between the (two specific) cells/TRPs/gNBs and report the same to the gNB/location server/LMF.

2) UE->gNB

For example, different cells/TRP/gNB may be required to use the same measurement filtering rule/criterion (e.g., measurement averaging rule/criterion). For example, when exchange of information between gNBs is fast beyond a certain level and it is difficult to accurately perform the same, it may be more appropriate for the UE to obtain/calculate the measurement using a specific measurement filtering rule/criterion (e.g., measurement averaging rule/criterion) and inform the cell/TRP/gNB of the rule that the UE uses.

According to various embodiments, the UE may transmit UE Rx-Tx time difference measurement values and/or RSTD values for K (>=1) cells/gNBs/TRPs to the cells/gNBs/TRPs. Additionally/alternatively, according to various embodiments, the UE may transmit a measurement filtering (e.g., measurement averaging) rule/criterion used to obtain the UE Rx-Tx time difference measurement values and/or RSTD values to the cells/gNBs/TRPs. According to various embodiments, in transmitting the measurement, the UE may also transmit/report a specific DL/UL RS resource on which the measurement is obtained to the cells/gNBs/TRPs. For example, the UE may (autonomously) determine the filtering window/rule (e.g., average window/rule), and/or conform a preconfigured rule/criterion from the location server/LMF/network.

Proposal ##: UE Reporting

According to various embodiments, in order to measure and/or compensate for a synchronization error of two specific cells/TRPs/gNBs, one or more and/or all of the following conditions may need to be satisfied for the UE Rx-Tx time difference measurement and/or RSTD measurement reported by the UE for the two specific cells/TRPs/gNBs:

For example, the UE may need to obtain and/or report UE Rx-Tx time difference measurement and/or RSTD measurement for the two specific cells/TRP/gNB using the "same PRS resource(s)."

For example, the UE Rx-Tx time difference measurement and RSTD measurement may be assigned the same time-stamp. That is, for example, the UE may assign and/or report the same time-stamp when reporting the measurement.

For example, the UE Rx-Tx time difference measurement and RSTD measurement may be determined by the same filtering (e.g., averaging) rule/criterion/window. For example, the UE may report a filtered value (e.g., an average value) for measurement samples acquired for the same time, using a PRS resource.

For example, the direction of the RX beam of the UE used to obtain the RSTD may need to be the same as the direction of the RX beam used to obtain the Rx-Tx time difference.

For example, the direction of the RX beam of the UE used to acquire the UE Rx-Tx time difference measurement and the RSTD measurement may need to be the same as the direction of the TX beam of the UE used to acquire the UE Rx-Tx time difference measurement.

According to various embodiments, the period over which the value a should be measured may be as configured follows:

For example, if δ is a fixed value, it may only need to be measured once.

For example, when δ is a time-varying value, continuous measurement/tracking thereof may be required.

Proposal ##

According to various embodiments, the UE may be configured/instructed by the gNB/location server/LMF to periodically (P)/semi-persistently (SP)/aperiodically (AP) report the value of a network synchronization error between two or more specific cells/TRPs/gNBs.

For example, the network may configure/instruct the UE to report a synchronization error between gNB #1 and gNB #2 every X (seconds). Thereby, for example, the network may track and/or appropriately compensate for the time-varying synchronization error. For example, when the network synchronization error is a value that does not change for a quite long time beyond a certain level, the network may receive a one-time report through aperiodic reporting.

According to various embodiments, the reporting may be indicated/configured in association with a specific rule/criterion requiring that reporting should be performed using L (>=1) most recent measurement samples.

According to various embodiments, a specific DL RS (e.g., PRS, CSI-RS, SSB, etc.) resource and/or resource set, and/or a specific UL RS (e.g., SRS, RACH, etc.) resource and/or resource set may be configured/indicated to the UE by the gNB/location server/LMF such that the UE may measure and/or report a network synchronization error value between two or more specific cells/gNBs/TRPs.

According to various embodiments, as the specific RS resource is configured/indicated to be used to estimate/measure the network synchronization error, more efficient operation may be achieved. For example, when the network synchronization error is significantly changed by more than a specific threshold at a long-term interval of 10 seconds or more, a specific DL RS and/or UL RS period may be set significantly longer than a certain level, and the UE may be configured to track the synchronization error using RS resources. For example, the RS period may be determined according to the synchronization error.

(Event-triggered) According to various embodiments, when the variation of the synchronization error value between specific cells/TRPs/gNBs exceeds a specific threshold value, the UE may be configured/instructed by the gNB/location server/LMF to report the synchronization error value. To this end, according to various embodiments, the gNB may periodically provide the gNB Rx-Tx time difference value to the UE and/or the UE may make a request for the information from the gNB.

According to various embodiments, the UE may continuously track/obtain the synchronization error value between the cells/TRPs/gNBs by utilizing the RTT measurement and/or the RSTD measurement. According to various embodiments, when the synchronization error value is changed beyond a certain level/level/threshold, the UE may report the same to the gNB/location server/LMF, thereby contributing to improvement of the UE-assisted and/or network-based positioning accuracy.

According to various embodiments, the UE may report the synchronization error value when reporting the synchronization error.

Additionally/alternatively, according to various embodiments, when reporting a synchronization error, the UE may be configured/instructed by the gNB/location server/LMF to report only the difference from the existing reported value (and/or previously reported value). For example, the UE may report a delta value as a difference value.

Additionally/alternatively, according to various embodiments, the UE may be configured/instructed by the gNB/location server/LMF to report only a difference from a specific level/level/threshold when reporting a synchronization error. For example, the UE may report a delta value as a difference value.

Timing Error Group (TEG)

In the description of various embodiments, the following definitions may be used for description of an internal timing error:

Transmit timing error (Tx timing error): For example, in terms of signal transmission, there may be a time delay from the time when a digital signal is generated in a baseband to the time when a radio frequency (RF) signal is transmitted through a Tx antenna. For example, to support positioning, the UE/TRP may implement/perform internal calibration/compensation of the Tx time delay for transmission of DL PRS/UL SRS, which may include calibration/compensation of a relative time delay between different RF chains of the same UE/TRP. For example, for the calibration/compensation, the offset of the Tx antenna phase center with respect to the physical antenna center may be considered. However, for example, the calibration/compensation may not be perfect, and the Tx time delay remaining after the calibration/compensation and/or the uncalibrated/uncompensated Tx time delay may be defined as a Tx timing error.

Receive timing error (Rx timing error): For example, in terms of signal reception, there may be a time delay from the time when the RF signal arrives at the Rx antenna to the time when the signal is digitized and time-stamped in baseband. For example, to support positioning, the UE/TRP may implement/perform internal calibration/compensation of the Rx time delay before reporting the measurement obtained from the DL PRS/UL SRS. The internal calibration/compensation may include calibration/compensation of a relative time delay between different RF chains of the same UE/TRP. For example, for the calibration/compensation, the offset of the Rx antenna phase center with respect to the physical antenna center may be considered. However, for example, the calibration/compensation may not be perfect, and the Rx time delay remaining after the calibration/compensation and/or the uncalibrated/uncompensated Rx time delay may be defined as an Rx timing error.

According to various embodiments, the following TEGs may be defined based on the above-described definition of the Tx/Rx timing error:

UE Tx "timing error group" (UE Tx TEG): For example, the UE Tx TEG may be associated with transmission of one or more UL SRS resources for positioning having a Tx timing error within a specific margin.

TRP Tx "timing error group" (TRP Tx TEG): For example, the TRP Tx TEG may be associated with transmission of one or more DL PRS resources having a Tx timing error within a specific margin.

UE Rx "timing error group" (UE Rx TEG): For example, the UE Rx TEG may be associated with one or more DL measurements having an Rx timing error within a specific margin.

TRP Rx "timing error group" (TRP Rx TEG): For example, the TRP Rx TEG may be associated with one or more UL measurements having an Rx timing error within a specific margin.

UE RxTx "timing error group" (UE RxTx TEG): For example, the UE RxTx TEG may be associated with one or more UL SRS resources for positioning having one or more UE Rx Tx time difference measurements, and an Rx timing error and a Tx timing error (Rx timing error+Tx timing error) within a specific margin.

TRP RxTx "timing error group" (TRP RxTx TEG): For example, the TRP RxTx TEG may be associated with one or more DL PRS resources having one or more gNB Rx Tx time difference measurements, and an Rx timing error and a Tx timing error (Rx timing error+Tx timing error) within a specific margin.

For example, a TEG may be understood to have a group delay related to an Rx timing error and/or Tx timing within the specific margin described above.

Differential RTT

Figure 16:
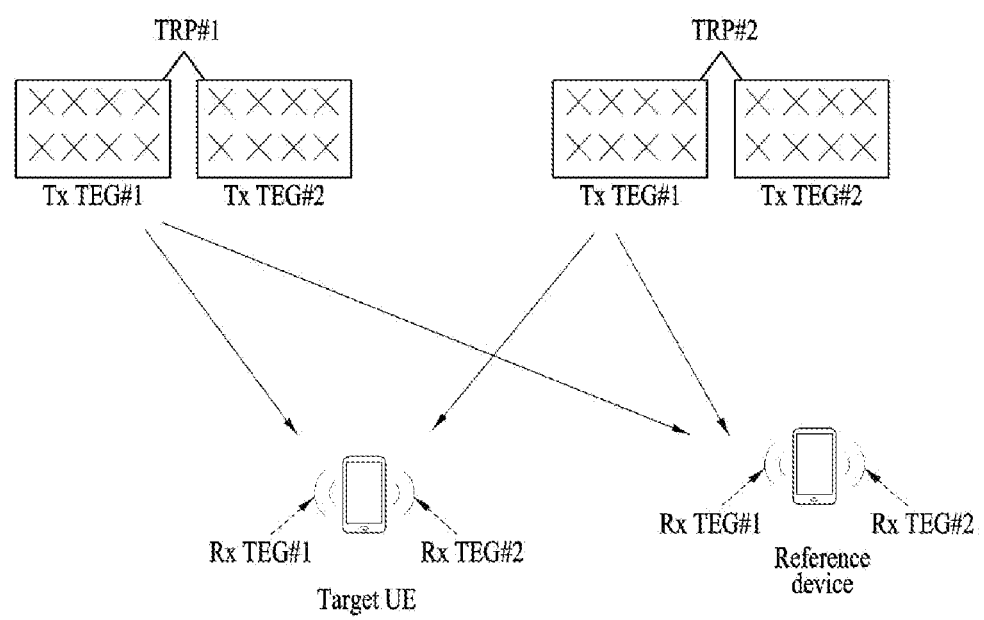
FIG. 16 is a diagram illustrating an example of a differential RTT according to various embodiments.

FIG. 16 is a diagram illustrating an example of a differential RTT according to various embodiments.

Referring to FIG. 16, for example, TRP #1 may include Tx TEG #1 and Tx TEG #2 and/or TRP #1 may correspond to Tx TEG #1 and Tx TEG #2. For example, TRP #2 may include Tx TEG #1 and Tx TEG #2 and/or TRP #2 may correspond to Tx TEG #1 and Tx TEG #2.

For example, the target UE may include Rx TEG #1 and Rx TEG #2 and/or the target UE may correspond to Rx TEG #1 and Rx TEG #2. For example, the reference device may include Rx TEG #1 and Rx TEG #2, and/or the reference device may correspond to Rx TEG #1 and Rx TEG #2.

For example, the reference device may represent a device whose location is (accurately) known and/or may be considered known, and may be a reference device with a known location. For example, the case where the location of the reference device is accurately known may include a case where the accuracy of the known reference device satisfies a specific precision (e.g., the accuracy is higher than or equal to a certain level).

For example, the reference device may be a UE/gNB/TRP, and may be preconfigured/pre-indicated and/or may be configured/indicated by a preconfigured rule/criterion and/or explicit/implicit signaling. For example, the reference device may be changed according to the preconfigured rule/criterion and/or explicit/implicit signaling.

For example, the reference device with a known location may be configured to support one or more of the following functions:

For example, measuring the DL PRS and reporting an associated measurement (e.g., RSTD, Rx-Tx time difference, RSRP, etc.) to the LMF;

For example, transmitting SRS and enabling the TRP to report a measurement and a measurement associated with the reference device (e.g., relative time of arrival (RTOA), Rx-Tx time difference, AOA, etc.) to the LMF;

For example, providing signals, measurements, parameters, etc. for Rx timing/Tx timing/angle of departure (AOD)/AOA improvement and/or measurement calibration;

For example, reporting the device (reference device) location coordinate information to the LMF when there is no information in the LMF.

Figure 17:
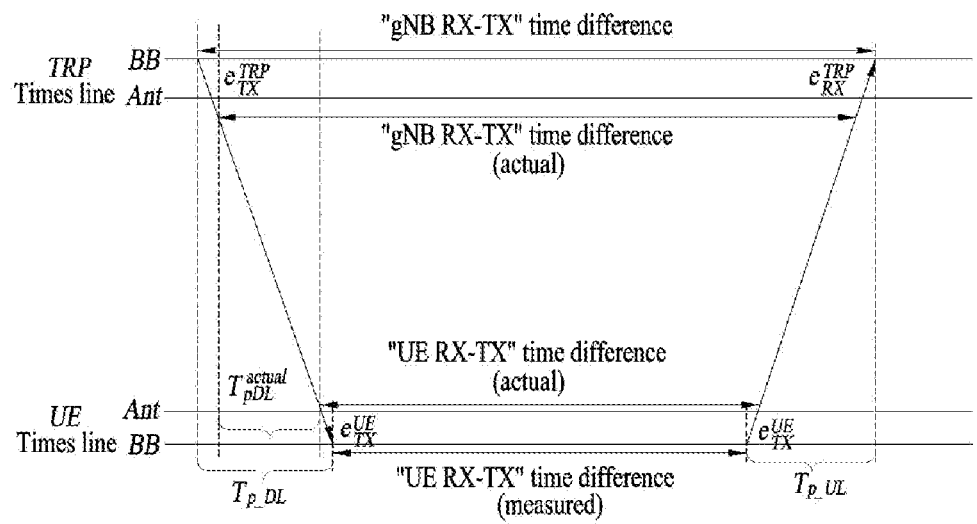
FIG. 17 is a diagram illustrating an example of a differential RTT according to various embodiments.

FIG. 17 is a diagram illustrating an example of a differential RTT according to various embodiments.

Referring to FIG. 17, as described above, for example, in terms of signal transmission, there may be a time delay from the time when a digital signal is generated in a baseband (BB) to the time when an RF signal is transmitted through a Tx antenna (Ant). In terms of signal reception, there may be a time delay from the time when the RF signal arrives at the Rx antenna to the time when the signal is digitized and time-stamped in the BB.

For example, a first signal (e.g., an RS for positioning) may be transmitted from the TRP and received by the UE. In the TRP, there may be a Tx timing error $e_{TX}^{TRP}$ from the time when the first signal is generated in the baseband to the time when the first signal is transmitted through the Tx antenna. In the UE, there may be an Rx timing error $e_{RX}^{UE}$ from the time when the first signal is received through the Rx antenna to the time when the first signal is processed in the baseband. For example, there may be a time difference $T_{p\_DL}$ between the time when the first signal is generated by the TRP in the baseband and the time when the first signal is processed by the UE in the baseband. According to various embodiments, $T_{p_{DL}}^{actual}$ which is the remaining time excluding $e_{TX}^{TRP}$ and $e_{RX}^{UE}$ in $T_{p\_DL}$ may be generated. For example, $T_{p_{DL}}^{actual}$ may be a time difference between the time when the first signal is transmitted from the TRP through the Tx antenna to the time when the first signal is received by the UE through the Rx antenna.

For example, a second signal (e.g., an RS for positioning) may be transmitted from the UE and received by the TRP. In the UE, there may be a Tx timing error $e_{TX}^{UE}$ from the time when the second signal is generated in the baseband to the time when the second signal is transmitted through the Tx antenna. In the TRP, there may be an Rx timing error $e_{RX}^{TRP}$ from the time when the second signal is received through the Rx antenna to the time when the second signal is processed in the baseband. For example, there may be a time difference $T_{p\_UL}$ between the time when the second signal is generated by the UE in the baseband and the time when the second signal is processed by the TRP in the baseband. According to various embodiments, $T_{p_{UL}}^{actual}$ which is the remaining time excluding $e_{TX}^{UE}$ and $e_{RX}^{TRP}$ in $T_{p\_UL}$ may be generated. For example, $T_{p_{UL}}^{actual}$ may be a time difference between the time when the second signal is transmitted from the UE through the Tx antenna to the time when the second signal is received by the TRP through the Rx antenna.

For example, the UE Rx-Tx time difference (measured) may be obtained as a time difference between the time when the first signal is processed by the UE in the baseband and the time when the second signal is generated by the UE in the baseband.

UE Rx-Tx time difference(measured)=(Time when the first signal is processed by the UE in the baseband)−(the time when the second signal is generated by the UE in the baseband)

For example, the gNB Rx-Tx time difference (measured) may be obtained as a time difference between the time when the second signal is processed by the TRP in the baseband and the time when the first signal is generated by the TRP in the baseband.

gNB Rx-Tx time difference(measured)=(Time when the second signal is processed by the TRP in the baseband)−(Time when the first signal is generated by the TRP in the baseband)

For example, the RTT (measured) may be the sum of the UE Rx-Tx time difference (measured) and the gNB Rx-Tx time difference (measured).

RTT(measured)=UE Rx-Tx time difference(measured)+gNB Rx-Tx time difference(measured)
={(Time when the first signal is processed by the UE in the baseband)−(Time when the second signal is generated by the UE) in the baseband)}+{(Time when the second signal is processed by the TRP in the baseband)−(Time when the first signal is generated by the TRP in the baseband)}

However, as described above, in this example, all Tx/Rx timings are obtained in the baseband, and may be associated with an actual propagation delay and/or a group delay.

For example, the (actual) UE Rx-Tx time difference may be obtained as a time difference between the time when the first signal is received by the UE through the Rx antenna and the time when the second signal is transmitted from the UE through the Tx antenna.

> UE Rx-Tx time difference(actual)=(Time when the first signal is received by the UE through the Rx antenna)−(Time when the second signal is transmitted from the UE through the Tx antenna)

Thus, for example, the UE Rx-Tx time difference (measured) may be a value obtained by adding $e_{TX}^{UE}$ and $e_{RX}^{UE}$ to the (actual) UE Rx-Tx time difference. For example, $e_{TX}^{UE}$ may be understood as a UE Tx group delay, $e_{RX}^{UE}$ may be understood as a UE Rx group delay, and the sum of $e_{TX}^{UE}$ and $e_{RX}^{UE}$ may be understood as the total group delay on the UE side.

For example, the (actual) gNB Rx-Tx time difference may be obtained as a time difference between the time when the second signal is received by the TRP through from the Rx antenna and the time when the first signal is transmitted from the TRP through the Tx antenna.

> gNB Rx-Tx time difference (actual)=(Time when the second signal is received by the TRP through from the Rx antenna)−(Time when the first signal is transmitted from the TRP through the Tx antenna).

Thus, for example, the (measured) gNB Rx-Tx time difference may be a value obtained by adding $e_{TX}^{TRP}$ and $e_{RX}^{TRP}$ to the (actual) gNB Rx-Tx time difference. For example, $e_{TX}^{TRP}$ may be understood as a TRP Tx group delay, $e_{RX}^{TRP}$ may be understood as a TRP Rx group delay, and the sum of $e_{TX}^{TRP}$ and $e_{RX}^{TRP}$ may be understood as the total group delay on the TRP side.

For example, the (actual) propagation time $T_{propagation}$ between the UE and the TRP may be half of the sum of the (actual) UE Rx-Tx time difference and the (actual) gNB Rx-Tx time difference.

$$2*T_{propagation} = ((actual)\text{UE Rx-Tx time difference}) + ((actual)\text{gNB Rx-Tx time difference})$$

For example, the following relationship may be established between the RTT (measured) and the (actual) propagation time $T_{propagation}$.

$$\text{RTT(measured)} = 2*T_{propagation} + (\text{Total group delay on the UE side}) + (\text{Total group delay on the TRP side}) = 2*T_{propagation} + (e_{TX}^{UE} + e_{RX}^{UE}) + (e_{TX}^{TRP} + e_{RX}^{TRP})$$

As described above, the measured RTT may include an error generated because all transmission/reception timings are obtained in the baseband. For example, since the RTT value is affected by the group delay/error on both the UE side and the TRP side, a method for eliminating the group delay/error may be required for more accurate positioning.

According to various embodiments, a method for eliminating the group delay/error may be provided.

For example, at least 4 TRPs may be required to eliminate the group delay/error. For example, RTTs between the UE and TRP #1/#2/#3/#4 may be represented as Equation 12.

$$RTT^1 = 2 \times T_p^{TRP1} + (e_{TX}^{TRP1} + e_{RX}^{TRP1}) + (e_{TX}^{UE} + e_{RX}^{UE})$$

$$RTT^2 = 2 \times T_p^{TRP2} + (e_{TX}^{TRP2} + e_{RX}^{TRP2}) + (e_{TX}^{UE} + e_{RX}^{UE})$$

$$RTT^3 = 2 \times T_p^{TRP3} + (e_{TX}^{TRP3} + e_{RX}^{TRP3}) + (e_{TX}^{UE} + e_{RX}^{UE})$$

$$RTT^4 = 2 \times T_p^{TRP4} + (e_{TX}^{TRP4} + e_{RX}^{TRP4}) + (e_{TX}^{UE} + e_{RX}^{UE}) \quad \text{[Equation 12]}$$

For example, $RTT^n$ may be an RTT between the UE and TRP #n.

For example, $T_p^{TRP1}$ may be a DL/UL propagation time between the UE and TRP #1.

For example, $e_{TX}^{TRPn}$ may be a Tx timing error of TRP #n. For example, $e_{TX}^{TRP1}$ may be a Tx timing error of TRP #1. For the other TRPs including TRP #2/#3/#4, $e_{TX}^{TRPn}$ may denote the Tx timing error of each TRP with the corresponding index.

For example, $e_{RX}^{TRPn}$ may be an Rx timing error of TRP #n. For example, $e_{RX}^{TRP1}$ may be an Rx timing error of TRP #1. For the other TRPs including TRP #2/#3/#4, $e_{RX}^{TRPn}$ may denote the Rx timing error of each TRP with the corresponding index.

For example, $e_{TX}^{UE}$ may be a Tx timing error of the UE.
For example, $e_{RX}^{UE}$ may be an Rx timing error of the UE.

According to various embodiments, the effect of the UE Tx/Rx timing error (($e_{TX}^{UE} + e_{RX}^{UE}$)) may be eliminated by the difference between two RTT measurement values, and may be represented as Equation 12-1.

$$RTT^1 - RTT^2 = 2 \times T_p^{TRP1} - 2 \times T_p^{TRP2} + (e_{TX}^{TRP1} + e_{RX}^{TRP1}) - (e_{TX}^{TRP2} + e_{RX}^{TRP2})$$

$$RTT^3 - RTT^2 = 2 \times T_p^{TRP3} - 2 \times T_p^{TRP2} + (e_{TX}^{TRP3} + e_{RX}^{TRP3}) - (e_{TX}^{TRP2} + e_{RX}^{TRP2})$$

$$RTT^4 - RTT^2 = 2 \times T_p^{TRP4} - 2 \times T_p^{TRP2} + (e_{TX}^{TRP4} + e_{RX}^{TRP4}) - (e_{TX}^{TRP2} + e_{RX}^{TRP2}) \quad \text{[Equation 12-1]}$$

For example, a sequential calibration and/or an iterative method for each RTT may be considered.

For example, as described above, the effect of the UE Tx/Rx timing error may be eliminated, but the effect of the Tx/Rx timing error of each TRP ($e_{TX}^{TRP1} + e_{RX}^{TRP1}$), etc.) may still be included in the measurement. For example, directly acquiring each of the Tx timing error and the Rx timing error may be most effective, which may be implemented when the propagation time is accurately measured (when the precision of propagation time measurement is very high beyond a certain level).

According to various embodiments, a reference device may be introduced, and a difference of the TRP Tx/Rx timing errors may be measured using the reference device. For the definition of the reference device according to various embodiments, reference may be made to the above description.

For example, the measurement of each of $RTT^1$, $RTT^2$, $RTT^3$, and $RTT^4$ may need to be accurate (have a higher accuracy than a certain level).

According to various embodiments, to eliminate the UE Tx/Rx timing error and the TRP Tx/Rx timing error, the target UE/reference device (e.g., reference UE) may operate as follows:

For example, the UE (target UE/reference device) may perform measurements for TRP #1 and TRP #2 using the same Rx/Tx TEG.

For example, TRP #1 and TRP #2 may perform Rx-Tx time difference measurement for a UE (target UE/reference device) using the same Rx/Tx TEG.

For example, when Rx-Tx time difference measurements are obtained using the Rx/Tx TEG, all Rx-Tx time difference measurements may be obtained using the same time window (measurement filtering time window (e.g., measurement filtering average window)).

For example, the Tx TEG and the Rx TEG of the UE (target UE/reference device) and the TRP may be associated with each other to configure a specific time window (measurement filtering time window (e.g., measurement filtering average window)). Additionally/alternatively, for example, N PRS occasions/SRS occasions may be indicated. For example, each UE measurement instance may be configured with N (>=1 or >1) instances of a DL PRS resource set. For example, each TRP measurement instance may be configured with M (>=1 or >1) SRS measurement time occasions.

For example, the location server/LMF may indicate/configure a specific single time window (measurement filtering time window (e.g., measurement filtering average window)) for the UE Tx/Rx TEG and/or the Tx/Rx TEG of TRP #1/#2.

According to various embodiments, when a reference device is introduced, one TRP may be required.

As described above, for example, the following relationship may be established between the (measured) RTT and the (actual) propagation time $T_{propagation}$.

$$RTT(measured)=2*T_{propagation}+(Total\ group\ delay\ on\ UE\ side)+(Total\ group\ delay\ on\ TRP\ side)=2*T_{propagation}+(e_{TX}^{UE}+e_{RX}^{UE})+(e_{TX}^{TRP}+e_{RX}^{TRP})$$

According to various embodiments, when a reference device is introduced, the above-described relationship may be represented as Equation 13 below.

$$RTT=2*T+e_{UE}+e_{TRP} \qquad [\text{Equation 13}]$$

For example, RTT may denote an RTT between the reference device and the TRP, and may be based on the Rx-Tx time difference measurement obtained from the reference device and the TRP.

For example, T may denote an ideal propagation time between the reference device and the TRP, and may be a known value.

For example, $e_{UE}$ is the total Rx/Tx timing delay of the reference device, and may be a known value and/or may be considered 0 when calibration/compensation is performed by the UE.

For example, $e_{TRP}$ is the total Rx/Tx timing delay of the TRP, and may be obtained from Equation 13.

According to various embodiments, $RTT^1$ and $RTT^2$ may be obtained as in Equation 14.

$$RTT^1=E[(UE\ RX-Tx)_1]_{T_{1,gNB}} \quad RX-Tx)_1]_{T_{1,UE}}+E[(gNB$$

$$RTT^2=E[(UE\ RX-Tx)_2]_{T_{2,gNB}} \quad RX-Tx)_2]_{T_{2,UE}}+E[(gNB \qquad [\text{Equation 14}]$$

For example, $RTT^n$ may be the RTT between the UE and TRP #n.

For example, E(x) may be an averaging function, and may be replaced by a filtering function F(x). For example, $E(x)_{T1,UE}$ may be an average value obtained from the UE based on TRP #1 (T1), and $E(x)_{T2,UE}$ may be an average value obtained from the UE based on TRP #2 (T2). $E(x)_{T1,gNB}$ may be an average value obtained from TRP #1 (T1), and $E(x)_{T2,gNB}$ may be an average value obtained from TRP #2 (T2). For example, in obtaining each average value, (the sizes of) the time windows used by the UE and the TRP may be the same and/or different. For example, in obtaining each average value, (the sizes of) the time windows used by TRP #1 and TRP #2 may be the same and/or different.

For example, (UE RX-Tx)$_n$ may be a UE Rx-Tx time difference measurement obtained from between the UE and TRP #n.

For example, (gNB RX-Tx)$_n$ may be a gNB Rx-Tx time difference measurement obtained from between the UE and TRP #n.

Figure 18:
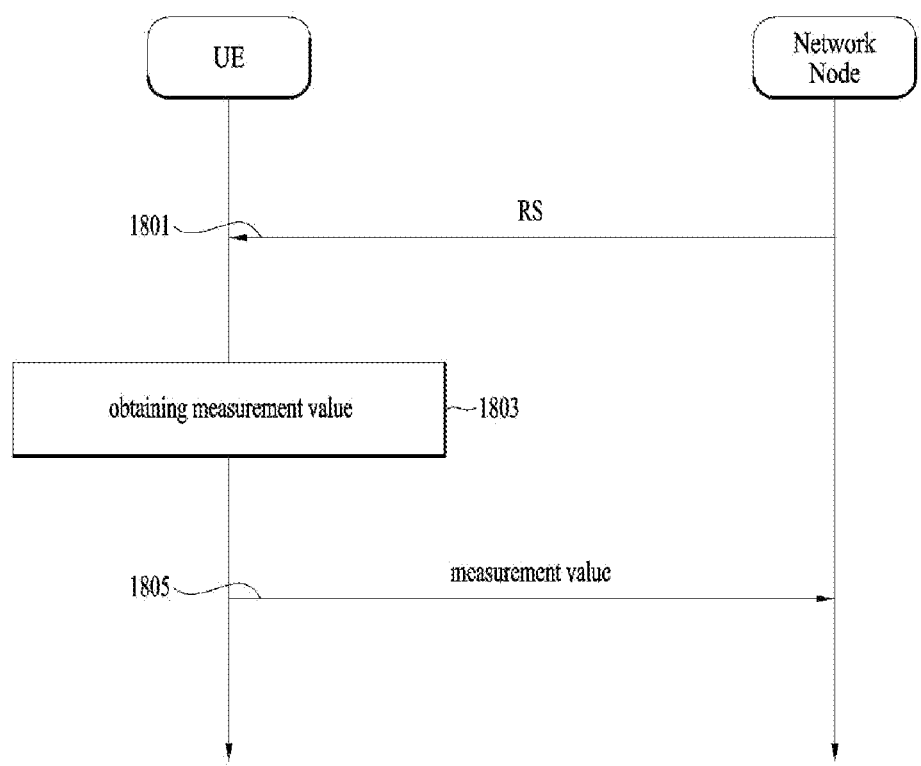
FIG. 18 is a diagram schematically illustrating a method of operating a UE and a network node according to various embodiments.

FIG. 18 is a diagram schematically illustrating a method of operating a UE and network nodes according to various embodiments.

Figure 19:
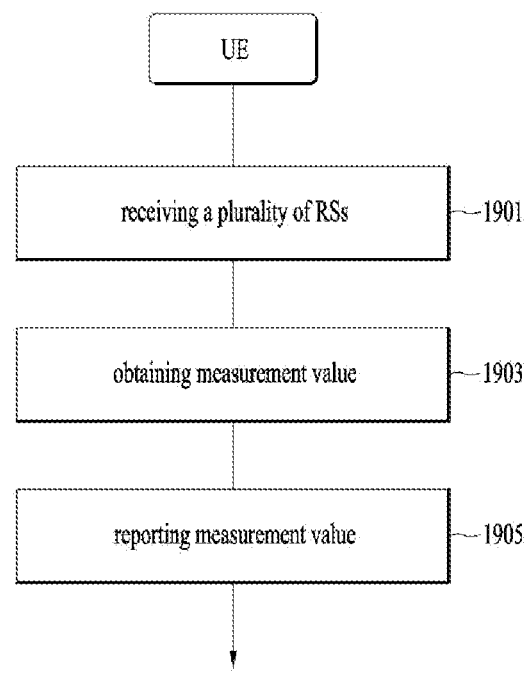
FIG. 19 is a flowchart illustrating a method of operating a UE according to various embodiments.

FIG. 19 is a flowchart illustrating a method of operating a UE according to various embodiments.

Figure 20:
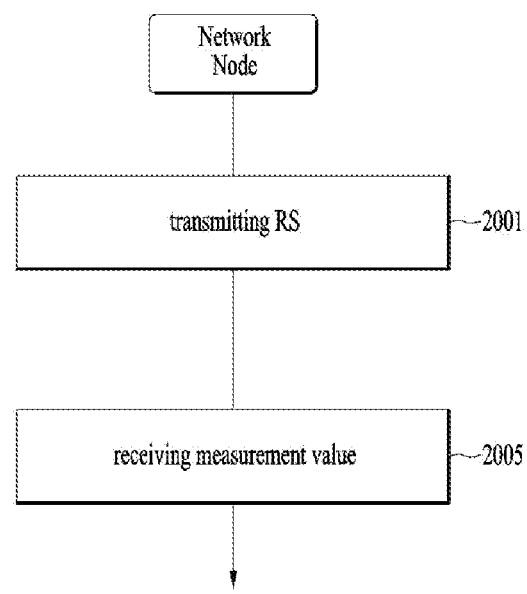
FIG. 20 is a flowchart illustrating a method of operating a network node according to various embodiments.

FIG. 20 is a flowchart illustrating a method of operating a network node according to various embodiments. For example, the network node may be a TP, and/or a gNB, and/or a cell, and/or a location server, and/or an LMF, and/or any device performing the same operation.

Referring to FIGS. 18 to 20, in operations 1801, 1901, and 2001 according to various embodiments, a network node may transmit an RS related to positioning, and the UE may receive a plurality of RSs related to positioning including the RS. For example, the plurality of RSs may be transmitted from a plurality of different network nodes and/or transmitted from one network node.

In operations 1803 and 1903 according to various embodiments, the UE may obtain a measurement value related to positioning. For example, obtaining the measurement value related to the positioning by the UE may include acquiring a plurality of samples based on at least one RS among the plurality of RSs, and obtaining acquiring the measurement value based on applying a preconfigured filter to the plurality of samples.

In operations 1805, 1905, and 2005 according to various embodiments, the UE may transmit information regarding the measurement value, and the network node may receive the same.

Specific operations of the UE and/or the network node according to the above-described various embodiments may be described and performed based on Section 1 to Section 3 described before.

Since examples of the above-described proposal method may also be included in one of implementation methods of the various embodiments, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information regarding rules of the proposed methods) through a predefined signal (e.g., a physical layer signal or a higher-layer signal).

4. Exemplary Configurations of Devices Implementing Various Embodiments 4.1. Exemplary Configurations of Devices to which Various Embodiments are Applied FIG. 21 is a diagram illustrating a device that implements various embodiments.

Figure 21:
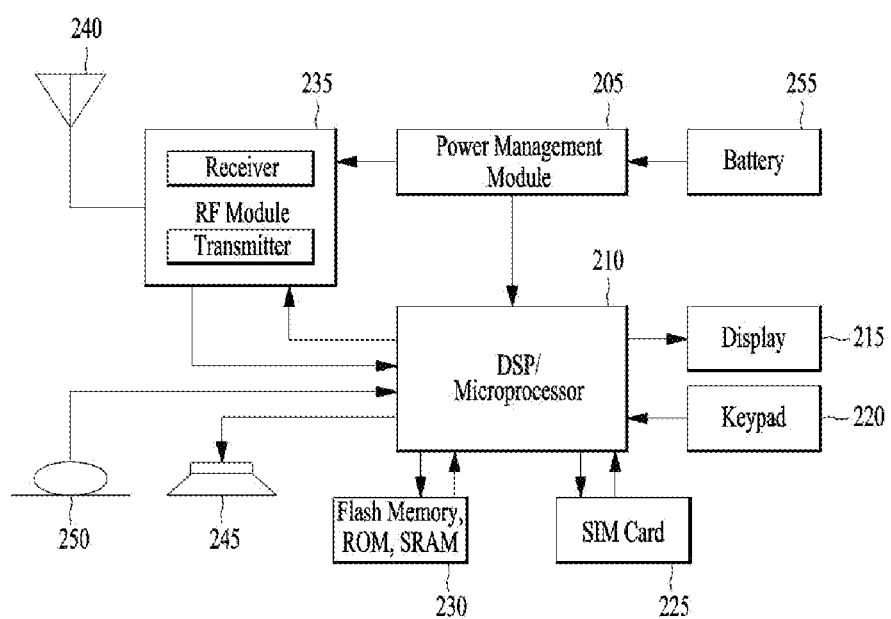
FIG. 21 is a block diagram illustrating an apparatus for implementing various embodiments.

The device illustrated in FIG. 21 may be a UE and/or a BS (e.g., eNB or gNB or TP) and/or a location server (or LMF) which is adapted to perform the above-described mechanism, or any device performing the same operation.

Referring to FIG. 21, the device may include a digital signal processor (DSP)/microprocessor 210 and a radio frequency (RF)module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 21 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 21 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor of a UE (or a communication device included in the UE) and/or a BS (or a communication device included in the BS) and/or a location server (or a communication device included in the location server) may operate by controlling a memory, as follows.

According to various embodiments, the UE or the BS or the location server may include at least one transceiver, at least one memory, and at least one processor coupled to the at least one transceiver and the at least one memory. The at least one memory may store instructions which cause the at least one processor to perform the following operations.

The communication device included in the UE or the BS or the location server may be configured to include the at least one processor and the at least one memory. The communication device may be configured to include the at least one transceiver or to be coupled to the at least one transceiver without including the at least one transceiver.

The TP and/or the BS and/or the cell and/or the location server and/or the LMF and/or any device performing the same operation may be referred to as a network node.

According to various embodiments, at least one processor included in the UE (or at least one processor of a communication device included in the UE) may receive a plurality of reference signals (RSs) related to positioning.

According to various embodiments, the at least one processor included in the UE may obtain a measurement value related to the positioning.

According to various embodiments, the at least one processor included in the UE may report information regarding the measurement value.

According to various embodiments, in obtaining the measurement value, the at least one processor included in the UE may acquire a plurality of samples based on at least one RS among the plurality of RSs, and obtain the measurement value based on applying a preconfigured filter to the plurality of samples.

According to various embodiments, (i) based on information related to a time window for the positioning being obtained, the at least one RS may be included in the time window; or (ii) based on information related the number of measurement samples being obtained, the number of the plurality of samples may be less than or equal to the number of the measurement samples.

According to various embodiments, based on information related to the time window being obtained, RSs other than the at least one RS among the plurality of RSs may not be included in the time window.

According to various embodiments, based on the information related to the time window being autonomously obtained by the at least one processor included in the UE, the at least one processor included in the UE may transmit the information related to the time window. According to various embodiments, the same window as the time window used by the at least one processor included in the UE may be used by the network (to obtain a measurement value related to positioning).

According to various embodiments, each of the plurality of RSs may be received based on a periodically configured positioning reference signal (PRS).

According to various embodiments, the size of the period of the periodically set PRS may be less than or equal to the size of the time window.

According to various embodiments, based on applying the preconfigured filter to the plurality of samples, the at least one processor included in the UE may apply the equation $$\Sigma_{n=1}^{L} R_n a_n.$$

According to various embodiments, L may be the number of the plurality of samples, $R_n$ may be an n-th sample among the plurality of samples, and $a_n$ may be a weighting factor used for the n-th sample.

According to various embodiments, the at least one processor included in the UE may receive information related to the weighting factor.

According to various embodiments, the at least one processor included in the UE may further perform one or more of the following: transmitting information related to the plurality of samples; or transmitting information related to the preconfigured filter. According to various embodiments, the same number of samples and/or the same filter as the plurality of samples used by the at least one processor included in the UE may be used by the network (to obtain a measurement value related to positioning).

According to various embodiments, at least one processor included in a network node (or at least one processor of a communication device included in the network node) may transmit a reference signal (RS) related to positioning.

According to various embodiments, the at least one processor included in the network node may receive information regarding a measurement value related to the positioning.

According to various embodiments, the measurement value may be equal to a value obtained based on applying a preconfigured filter to a plurality of samples based on at least one RS among a plurality of RSs related to the positioning.

Specific operations of the UE and/or the network node according to the above-described various embodiments may be described and performed based on Section 1 to Section 3 described before.

Unless contradicting each other, various embodiments may be implemented in combination. For example, (the processor included in) the UE and/or the network node according to various embodiments may perform operations in combination of the embodiments of the afore-described in Section 1 to Section 3, unless contradicting each other.

4.2. Example of Communication System to which Various Embodiments are Applied In the present specification, various embodiments have been mainly described in relation to data transmission and reception between a BS and a UE in a wireless communication system. However, various embodiments are not limited thereto. For example, various embodiments may also relate to the following technical configurations.

The various descriptions, functions, procedures, proposals, methods, and/or operational flowcharts of the various embodiments described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 22:
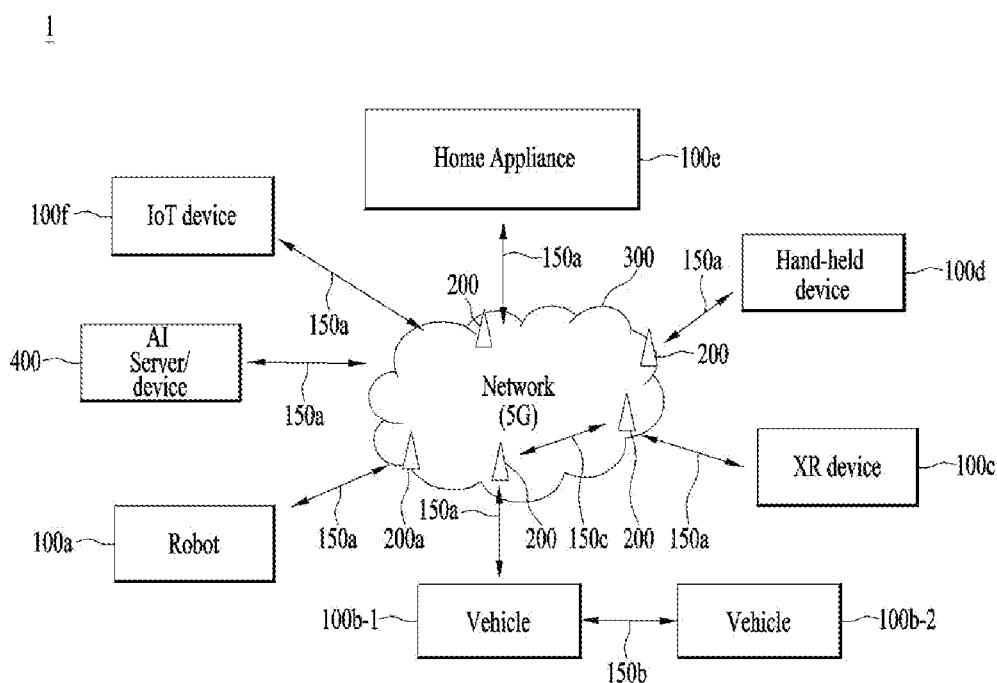
FIG. 22 illustrates an exemplary communication system to which various embodiments are applied.

FIG. 22 illustrates an exemplary communication system to which various embodiments are applied.

Referring to FIG. 22, a communication system 1 applied to the various embodiments includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments.

Example of Wireless Devices to which Various Embodiments are Applied

Figure 23:
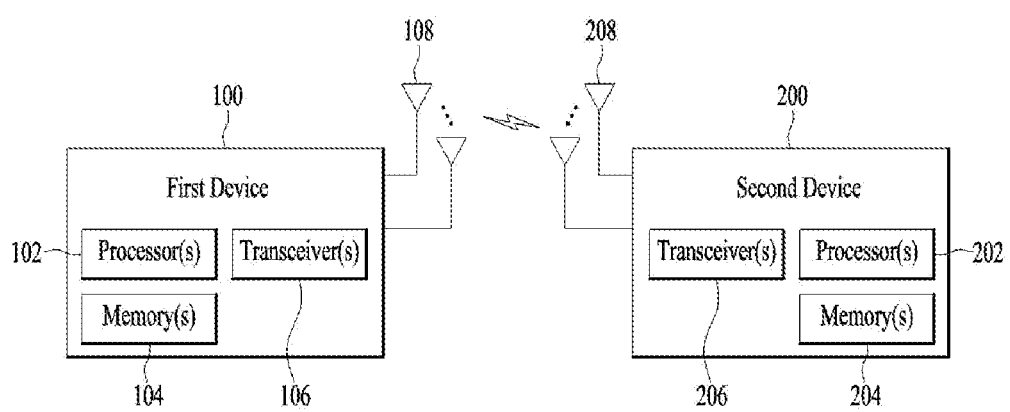
FIG. 23 illustrates exemplary wireless devices to which various embodiments are applicable.

FIG. 23 illustrates exemplary wireless devices to which various embodiments are applicable.

Referring to FIG. 23, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include at least one processor 102 and at least one memory 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments, the wireless device may represent a communication modem/circuit/chip.

The second wireless device 200 may include at least one processor 202 and at least one memory 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s)

204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments, the wireless device may represent a communication modem/circuit/chip.

Hereinafter, hardware elements of the wireless devices 100 and 200 will be described more specifically. One or more protocol layers may be implemented by, without being limited to, at least one processor 102 and 202. For example, the at least one processor 102 and 202 may implement one or more layers (e.g., functional layers such as PHY, MAC, RLC, PDCP, RRC, and SDAP). The at least one processor 102 and 202 may generate one or more Protocol Data Units (PDUs) and/or one or more Service Data Unit (SDUs) according to the descriptions, functions, procedures, proposals, methods, and/or operational flowcharts disclosed in this document. The at least one processor 102 and 202 may generate messages, control information, data, or information according to the descriptions, functions, procedures, proposals, methods, and/or operational flowcharts disclosed in this document. The at least one processor 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The at least one processor 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The at least one processor 102 and 202 may be referred to as controllers, microcontrollers, microprocessors, or microcomputers. The at least one processor 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the at least one processor 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the at least one processor 102 and 202 or stored in the at least one memory 104 and 204 so as to be driven by the at least one processor 102 and 202. The descriptions, functions, procedures, proposals, methods, and/or operational flowcharts disclosed in this document may be implemented using firmware or software in the form of code, commands, and/or a set of commands.

The at least one memory 104 and 204 may be connected to the at least one processor 102 and 202 and store various types of data, signals, messages, information, programs, code, instructions, and/or commands. The at least one memory 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The at least one memory 104 and 204 may be located at the interior and/or exterior of the at least one processor 102 and 202. The at least one memory 104 and 204 may be connected to the at least one processor 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the at least one processor 102 and 202 and transmit and receive radio signals. For example, the at least one processor 102 and 202 may perform control so that the one or more transceivers 106 and 206 may transmit user data, control information, or radio signals to one or more other devices. The at least one processor 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the at least one processor 102 and 202. The one or more transceivers 106 and 206 may convert the user data, control information, radio signals/channels, etc. processed using the at least one processor 102 and 202 from the base band signals into the RF band signals. To this end, the one or more transceivers 106 and 206 may include (analog) oscillators and/or filters.

According to various embodiments, at least one memory (e.g., 104 or 204) may store instructions or programs which, when executed, cause at least one processor operably coupled to the at least one memory to perform operations according to various embodiments or implementations of the present disclosure.

According to various embodiments, a computer-readable storage medium may store at least one instruction or computer programs which, when executed by at least one processor, cause the at least one processor to perform operations according to various embodiments or implementations of the present disclosure.

According to various embodiments, a processing device or apparatus may include at least one processor and one or more computer memories connected to the at least one processor. The one or more computer memories may store instructions or programs which, when executed, cause the at least one processor operably coupled to the at least one memory to perform operations according to various embodiments or implementations of the present disclosure.

Example of Using Wireless Devices to which Various Embodiments are Applied

Figure 24:
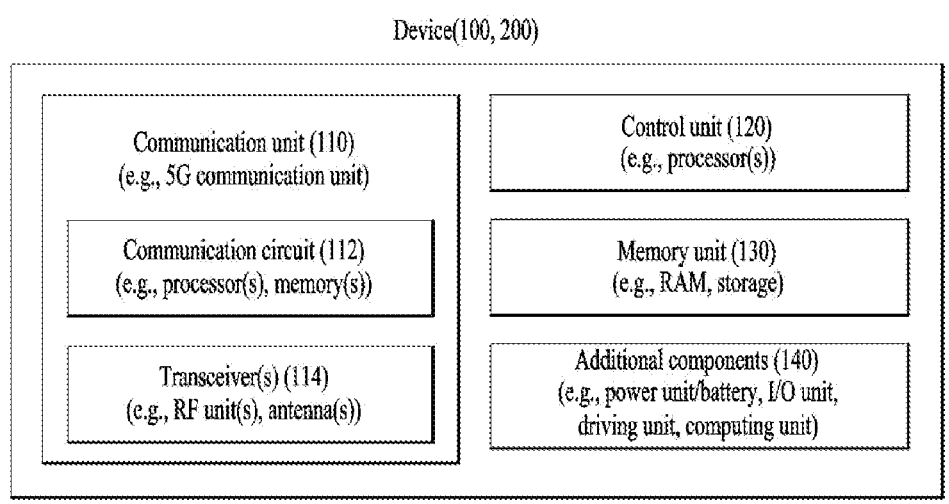
FIG. 24 illustrates other exemplary wireless devices to which various embodiments are applied.

FIG. 24 illustrates other exemplary wireless devices to which various embodiments are applied. The wireless devices may be implemented in various forms according to a use case/service (see FIG. 22).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the at least one processor 102 and 202 and/or the at least one memory 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of at least one processor. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Example of Portable Device to which Various Embodiments are Applied

Figure 25:
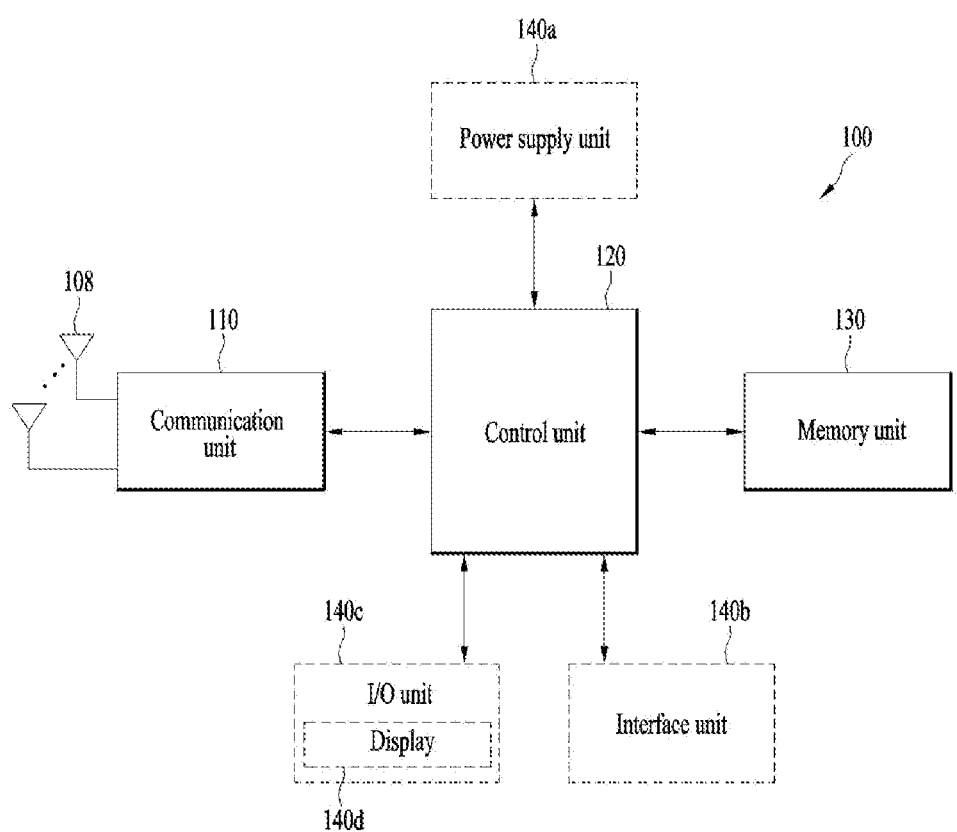
FIG. 25 illustrates an exemplary portable device to which various embodiments are applied.

FIG. 25 illustrates an exemplary portable device to which various embodiments are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 26:
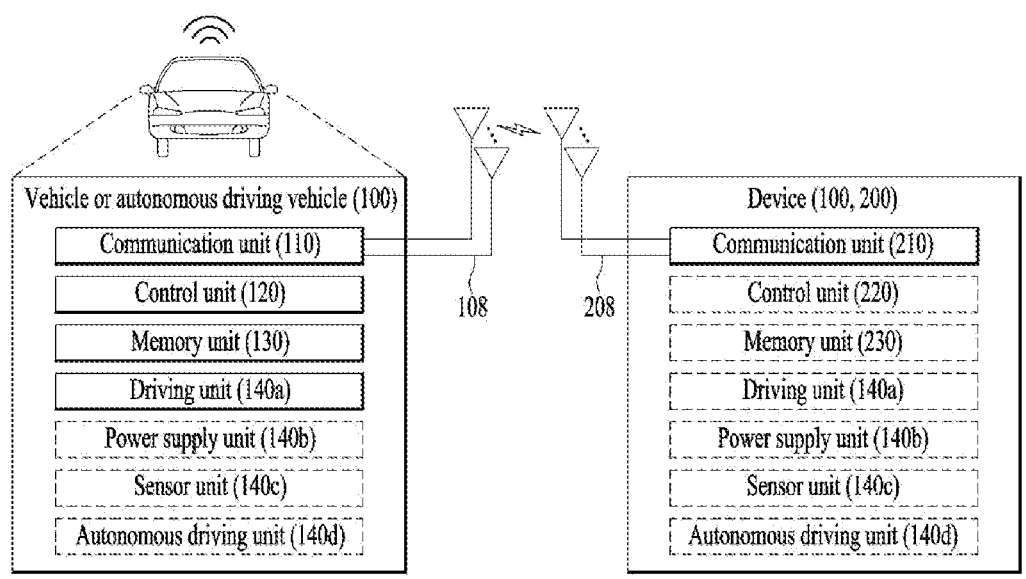
FIG. 26 illustrates an exemplary vehicle or autonomous driving vehicle to which various embodiments are applied.

Example of Vehicle or Autonomous Driving Vehicle to which Various Embodiments are Applied FIG. 26 illustrates an exemplary vehicle or autonomous driving vehicle to which various embodiments. The vehicle or autonomous driving vehicle may be implemented as a mobile robot, a car, a train, a manned/unmanned aerial vehicle (AV), a ship, or the like.

Referring to FIG. 26, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information regarding a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

In summary, various embodiments may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI)module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MM-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MM-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

The wireless communication technology in which various embodiments are implemented may include LTE, NR, and 6G, as well as narrowband Internet of things (NB-IoT) for low power communication. For example, the NB-IoT technology may be an example of low power wide area network (LPWAN) technology and implemented as the standards of LTE category (CAT) NB1 and/or LTE Cat NB2. However, these specific appellations should not be construed as limiting NB-IoT. Additionally or alternatively, the wireless communication technology implemented in a wireless device according to various embodiments may enable communication based on LTE-M. For example, LTE-M may be an example of the LPWAN technology, called various names such as enhanced machine type communication (eMTC). For example, the LTE-M technology may be implemented as, but not limited to, at least one of 1) LTE CAT 0, 2) LTE Cat M1, 3) LTE Cat M2, 4) LTE non-bandwidth limited (non-BL), 5) LTE-MTC, 6) LTE machine type communication, and/or 7) LTE M. Additionally or alternatively, the wireless communication technology implemented in a wireless device according to various embodiments may include, but not limited to, at least one of ZigBee, Bluetooth, or LPWAN in consideration of low power communication. For example, ZigBee may create personal area networks (PANs) related to small/low-power digital communication in conformance to various standards such as IEEE 802.15.4, and may be referred to as various names.

Various embodiments may be implemented in various means. For example, various embodiments may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments may be carried out in other specific ways than those set forth herein without departing from the spirit and essential characteristics of the various embodiments. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The various embodiments are applicable to various wireless access systems including a 3GPP system, and/or a 3GPP2 system. Besides these wireless access systems, the various embodiments are applicable to all technical fields in which the wireless access systems find their applications. Moreover, the proposed method can also be applied to mmWave communication using an ultra-high frequency band.

The invention claimed is:

1. A method performed by an apparatus, the method comprising:
receiving a plurality of reference signals (RSs) related to positioning;
obtaining a measurement value related to the positioning; and
reporting information regarding the measurement value, wherein the obtaining of the measurement value comprises:
acquiring a plurality of samples based on at least one RS among the plurality of RSs; and
obtaining the measurement value based on a filter that applies a plurality of weight factors to the plurality of samples, respectively, wherein the plurality of weight factors are configured through network signaling.

2. The method of claim 1, wherein:
(i) based on information related to a time window for the positioning being obtained, the at least one RS are included in the time window; or
(ii) based on information related to the number of measurement samples being obtained, the number of the plurality of samples is less than or equal to the number of the measurement samples.

3. The method of claim 2, wherein, based on the information related to the time window being obtained, RSs other than the at least one RS among the plurality of RSs are not included in the time window.

4. The method of claim 2, further comprising:
based on the information related to the time window being autonomously obtained by the apparatus, transmitting the information related to the time window.

5. The method of claim 2, wherein each of the plurality of RSs is received based on a periodically configured positioning reference signal (PRS),
wherein a size of a period of the periodically configured PRS is less than or equal to a size of the time window.

6. The method of claim 1, wherein the filter is related to $$\Sigma_{n=1}^{L} R_n a_n,$$

wherein L is the number of the plurality of samples, $R_n$ is an n-th sample among the plurality of samples, and $a_n$ is a weight factor used for the n-th sample.

7. The method of claim 6, further comprising:
receiving information related to the plurality of weight factor.

8. The method of claim 1, further comprising at least one of:
transmitting information related to the plurality of samples; or
transmitting information related to the filter.

9. A user equipment (UE) comprising:
a transceiver; and
at least one processor coupled with the transceiver;
wherein the at least one processor is configured to:
receive a plurality of reference signals (RSs) related to positioning;
obtain a measurement value related to the positioning; and
report information regarding the measurement value,
wherein, in obtaining the measurement value, the at least one processor is configured to:
acquire a plurality of samples based on at least one RS among the plurality of RSs; and
obtain the measurement value based on a filter that applies a plurality of weight factors to the plurality of samples, respectively, wherein the plurality of weight factors are configured through network signaling.

10. The UE of claim 9, wherein the filter is related to $$\Sigma_{n=1}^{L} R_n a_n,$$

wherein L is the number of the plurality of samples, $R_n$ is an n-th sample among the plurality of samples, and $a_n$ is a weight factor used for the n-th sample.

11. The UE of claim 9, wherein the at least one processor is configured to:
communicate with one or more of a mobile terminal, a network, and an autonomous vehicle other than a vehicle containing the terminal.

12. A method performed by an apparatus, the method comprising:
transmitting, to another apparatus, information regarding a plurality of weight factors of a filter;
transmitting, to the another apparatus, a reference signal (RS) related to positioning; and
receiving, from the another apparatus, information regarding a measurement value for a plurality of samples of the RS related to the positioning, wherein the plurality of weight factors of the filter are applied to the plurality of samples.

13. A base station comprising:
a transceiver; and
at least one processor coupled with the transceiver,
wherein the at least one processor is configured to:
transmit, to another apparatus, information regarding a plurality of weight factors of a filter;
transmit, to the another apparatus, a reference signal (RS) related to positioning; and
receive, from the another apparatus, information regarding a measurement value for a plurality of samples of the RS related to the positioning,
wherein the plurality of weight factors of the filter are applied to the plurality of samples.

* * * * *